United States Patent
Waki

(10) Patent No.: US 8,090,235 B2
(45) Date of Patent: Jan. 3, 2012

(54) RELAY APPARATUS, AND REPRODUCTION SYSTEM

(75) Inventor: Tsuyoshi Waki, Ichikawa (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 1338 days.

(21) Appl. No.: 11/713,692

(22) Filed: Mar. 5, 2007

(65) Prior Publication Data
US 2007/0226769 A1   Sep. 27, 2007

(30) Foreign Application Priority Data

Mar. 7, 2006 (JP) ................................. 2006-061560
Mar. 22, 2006 (JP) ................................. 2006-078162

(51) Int. Cl.
*H04N 5/60* (2006.01)
*H04N 5/63* (2006.01)
*H04N 5/76* (2006.01)
*H04N 7/16* (2011.01)

(52) U.S. Cl. ........ 386/231; 348/738; 386/220; 386/354; 725/151

(58) Field of Classification Search .................. 348/725, 348/738, 553; 381/27, 306; 386/219, 220, 386/230, 231, 334, 337–339, 353–357; 725/131, 725/139, 151; 375/240.25, 240.26; 710/20, 710/21, 33
See application file for complete search history.

(56) References Cited

U.S. PATENT DOCUMENTS

| | | | | |
|---|---|---|---|---|
| 6,115,080 A * | 9/2000 | Reitmeier | | 348/731 |
| 6,118,820 A * | 9/2000 | Reitmeier et al. | | |
| 6,246,720 B1 * | 6/2001 | Kutner et al. | | 375/240.25 |
| 6,263,503 B1 * | 7/2001 | Margulis | | 725/81 |
| 7,305,694 B2 * | 12/2007 | Commons et al. | | 725/80 |
| 7,995,898 B2 * | 8/2011 | Sasaki et al. | | 386/231 |
| 2002/0129374 A1 * | 9/2002 | Freeman et al. | | 725/91 |
| 2003/0147629 A1 * | 8/2003 | Kikuchi et al. | | 386/69 |
| 2004/0197074 A1 * | 10/2004 | Sagishima | | 386/46 |
| 2004/0264927 A1 * | 12/2004 | Evans et al. | | 386/94 |
| 2005/0008323 A1 * | 1/2005 | Han | | 386/37 |
| 2006/0104617 A1 * | 5/2006 | Mukaide et al. | | 386/97 |
| 2007/0280646 A1 * | 12/2007 | Seita et al. | | 386/96 |

FOREIGN PATENT DOCUMENTS

| JP | 03-165676 | 7/1991 |
|---|---|---|
| JP | 2004-007389 | 1/2004 |

OTHER PUBLICATIONS

Notification of Reason for Refusal (Application No. 2006-078162) dated Aug. 2, 2011.

* cited by examiner

*Primary Examiner* — Victor Kostak
(74) *Attorney, Agent, or Firm* — Eric J. Robinson; Robinson Intellectual Property Law Office, P.C.

(57) ABSTRACT

The invention prevents unwanted sounds from being outputted from an AV output apparatus such as a HDTV receiver. In the invention, when a streaming signal of a predetermined format having video data and audio data is inputted to a streaming input terminal 10, separation unit 23 of a relay apparatus 2 separates this signal into the video data and audio data. HDMI transmitter 27 generates and outputs a streaming signal having the video data separated by the separation unit 23, of the same format as that of the streaming signal inputted to the streaming input terminal 10.

6 Claims, 12 Drawing Sheets

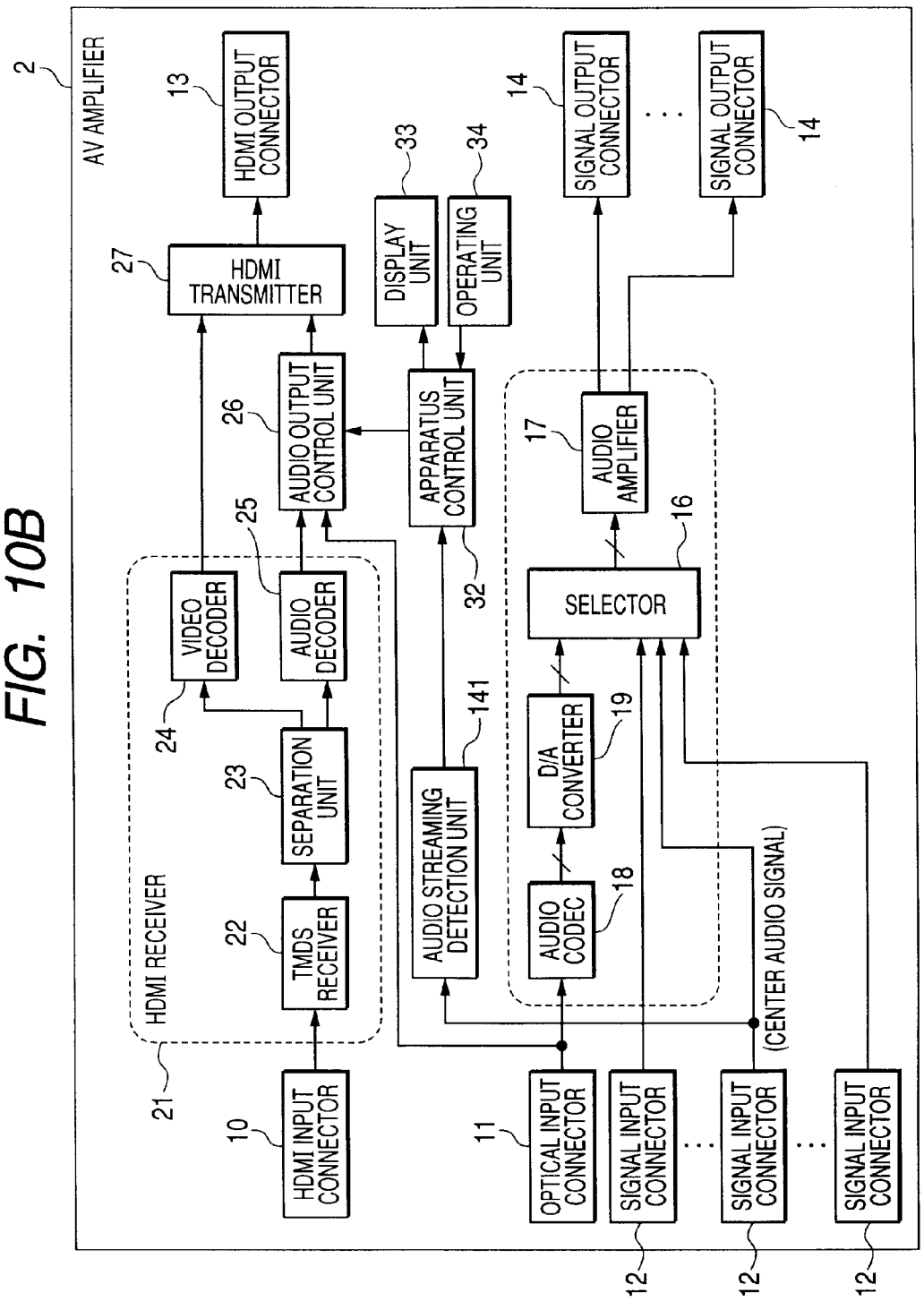

RELAY APPARATUS, AND REPRODUCTION SYSTEM

BACKGROUND OF THE INVENTION

1. Field of the Invention

The present invention relates to a relay apparatus, AV reproduction system and AV source apparatus.

2. Related Background Art

Japanese Patent Application Laid-Open No. 2004-357029 (FIG. 1, embodiments etc.) discloses a video display apparatus. The video display apparatus has a HDMI terminal. The video display apparatus processes a digital input signal inputted from an AV apparatus to the HDMI terminal and generates an analog video signal and an analog audio signal. The video display apparatus displays pictures based on the generated analog video signal and outputs sounds based on the generated analog audio signal.

In order to enjoy high-quality sounds and pictures, such as film and music, recorded on a DVD or the like, a 5.1 channel loudspeaker system or the like has been used in the AV system. When the 5.1 channel loudspeaker system is used, the HDTV receiver and the 5.1 channel loudspeaker system are connected to a source apparatus such as a DVD player. The HDTV receiver receives a HDMI signal from the DVD player and displays pictures based on video streaming data contained in the HDMI signal. The 5.1 channel loudspeaker system receives a digital or analog audio signal from the DVD player and outputs sounds based on the audio signal.

However, the HDMI signal outputted from the DVD player includes audio streaming data, together with the video streaming data. Accordingly, the HDTV receiver will output sounds based on the audio streaming data contained in the HDMI signal inputted from the DVD player. Thus, the sounds outputted from the HDTV receiver will be made to mix with high-quality sounds from the 5.1 channel loudspeaker system; and no correct sound space can be created using the 5.1 channel loudspeaker system. The viewer cannot enjoy high-quality sounds by use of the 5.1 channel loudspeaker system.

Particularly, when a source apparatus such as a DVD player down-mixes a 5.1 channel audio streaming data to a 2-channel audio streaming data or the like, and adds the audio streaming data obtained by the down-mixing to a HDMI signal, the HDTV receiver will output sounds having sound quality different from that of the 5.1 channel loudspeaker system.

Accordingly, in order to enjoy high-quality sounds and pictures recorded on a DVD or the like, the user of AV system must set sound mute in the HDTV receiver whenever playing the DVD or the like. Also, the user of AV system must set sound mute cancellation in the HDTV receiver whenever playing of the DVD or the like is finished.

An object of the present invention is to obtain a relay apparatus, AV reproduction system and AV source apparatus capable of preventing unwanted sounds from being outputted from an AV output apparatus such as a HDTV receiver.

SUMMARY OF THE INVENTION

A relay apparatus according to the present invention includes: a streaming input terminal for inputting a streaming signal carrying video data and audio data at a predetermined format; separation means for separating the video data and audio data from the streaming signal inputted to the streaming input terminal; and output means for generating and outputting a streaming signal having the video data separated by the separation means and having the same format as that of the streaming signal inputted to the streaming input terminal.

In addition to the above described constituent parts according to the present invention, the inventive relay apparatus is characterized in that the streaming signal generated by the output means either has silent audio data or has no audio data.

The inventive relay apparatus may further include: an audio input terminal for inputting audio data or an audio signal having the same content as that of the audio data in order to perform relaying; and output means for generating and outputting a streaming signal having the video data separated by the separation means and having the same format as that of the streaming signal inputted to the streaming input terminal, when the audio streaming data or audio streaming signal is inputted to the audio input terminal, or when the audio data separated by the separation means is audio streaming data or audio data based thereon.

In addition to the above described constituent parts according to the present invention, the inventive relay apparatus is characterized in that the streaming signal generated by the output means either has silent audio data or has no audio data.

In addition to the above described constituent parts according to the present invention, the inventive relay apparatus further includes a streaming output terminal for outputting the streaming signal generated by the output means; and an audio output terminal for outputting audio data or an audio signal based on the audio data or audio signal inputted to the audio input terminal.

An AV source apparatus according to the present invention includes: acquisition means for acquiring a streaming signal of a predetermined format having video data and audio data; separation means for separating the video data and audio data from the streaming signal acquired by the acquisition means; an audio output terminal for outputting audio data or an audio signal having the same content as that of the audio data on the basis of the audio data separated by the separation means; output means for generating a streaming signal having the video data separated by the separation means and having the same format as that of the streaming signal acquired by the acquisition means, when the audio data separated by the separation means is audio streaming data; and a streaming output terminal for outputting the streaming signal generated by the output means.

In addition to the above described constituent parts according to the present invention, the inventive AV source apparatus is characterized in that the streaming signal generated by the output means either has silent audio data or has no audio data.

According to a second aspect of the present invention, a relay apparatus according to the present invention includes: a streaming input terminal for inputting a streaming signal of a predetermined format having video data and audio streaming data; separation means for separating the video data and audio streaming data from the streaming signal inputted to the streaming input terminal; and output means for generating and outputting, along with the video data separated by the separation means, a streaming signal having data of one channel component of the audio streaming data separated by the separation means and having the same format as that of the streaming signal inputted to the streaming input terminal.

In addition to the above described constituent parts according to the present invention, another inventive relay apparatus is characterized in that the output means generates a streaming signal having data of a center-channel component of the audio streaming data.

The inventive relay apparatus further includes: a digital audio input terminal for inputting audio streaming data having the same content as that of the audio data in order to perform relaying; and output means for generating and outputting, along with the video data separated by the separation means, a streaming signal having data of one channel component of the audio streaming data inputted to the digital audio input terminal and having the same format as that of the streaming signal inputted to the streaming input terminal, when audio streaming data or an audio streaming signal is inputted to the streaming input terminal, the digital audio input terminal or another audio input terminal.

In addition to the above described constituent parts according to the present invention, the inventive relay apparatus is characterized in that the output means generates a streaming signal having data of a center-channel component of the audio streaming data.

In addition to the above described constituent parts according to the present invention, the inventive relay apparatus includes a streaming output terminal for outputting the streaming signal generated by the output means; and an audio output terminal for outputting audio streaming data or an audio streaming signal having the same content as that of the audio data inputted to the streaming input terminal.

An AV source apparatus according to the present invention includes: acquisition means for acquiring a streaming signal of a predetermined format having video data and audio streaming data; separation means for separating the video data and audio streaming data from the streaming signal acquired by the acquisition means; an audio output terminal for outputting audio streaming data or an audio streaming signal having the same content as that of the audio streaming data on the basis of the audio streaming data separated by the separation means; output means for generating and outputting, along with the video data separated by the separation means, a streaming signal having data of one channel component of the audio streaming data separated by the separation means and having the same format as that of the streaming signal acquired by the acquisition means; and a streaming output terminal for outputting the streaming signal generated by the output means.

In addition to the above described constituent parts according to the present invention, the inventive AV source apparatus is characterized in that the output means generates a streaming signal having data of a center-channel component of the audio streaming data.

An AV reproduction system according to the present invention includes a relay apparatus and an AV source apparatus, wherein the relay apparatus includes: a streaming input terminal for inputting a streaming signal of a predetermined format carrying video data and audio data; an audio input terminal for inputting audio data or an audio signal having the same content as that of the audio data in order to perform relaying; separation means for separating the video data and audio data from the streaming signal inputted to the streaming input terminal; and output means for generating and outputting a streaming signal carrying the video data separated by the separation means and having the same format as that of the streaming signal inputted to the streaming input terminal, wherein the AV source apparatus is connected to the streaming input terminal and the audio input terminal of the relay apparatus, and outputs to the streaming input terminal, the streaming signal of a predetermined format carrying video data and audio data and at the same time, outputs the audio data or the audio signal to the audio input terminal.

According to the present invention, unwanted sounds can be prevented from being outputted from an AV output apparatus such as a HDTV receiver.

BRIEF DESCRIPTION OF THE DRAWINGS

FIG. 10(B) is an apparatus configuration diagram illustrating a variation of the AV amplifier according to Embodiment 1.

DESCRIPTION OF THE PREFERRED EMBODIMENTS

A relay apparatus, AV reproduction system and AV source apparatus according to embodiments of the present invention will be described below with reference to the drawings. The relay apparatus will be described with respect to Embodiment 1 by taking an AV (Audio Visual) amplifier as an example. The AV source apparatus will be described with respect to Embodiment 2 by taking a DVD player as an example. The AV reproduction system will be described as a system including the AV amplifier or DVD player with respect to each embodiment.

Embodiment 1

Figure 1A:
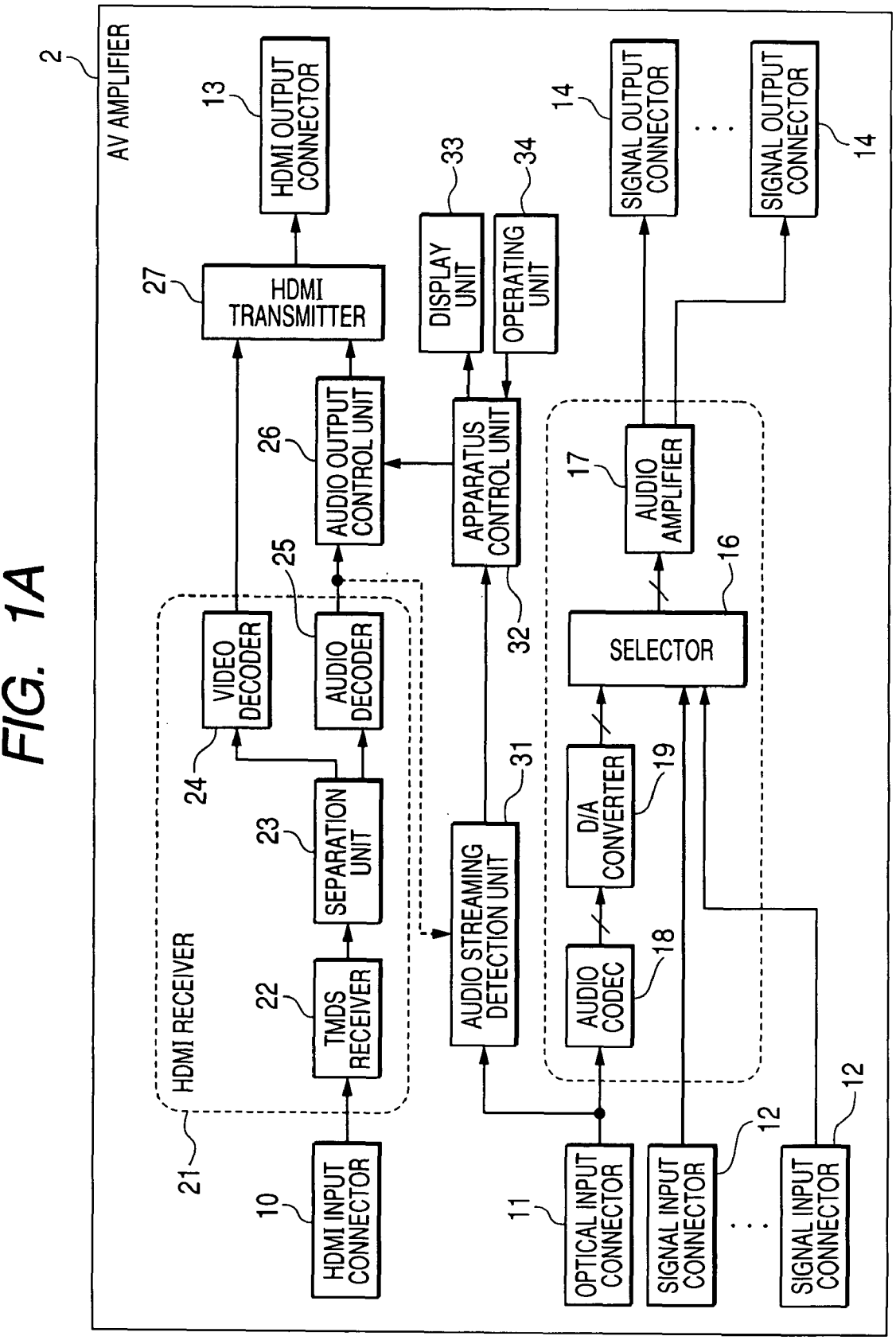
FIG. 1(A) is an apparatus configuration diagram illustrating a configuration of an AV amplifier serving as a relay apparatus according to Embodiment 1 of the present invention.
Figure 1B:
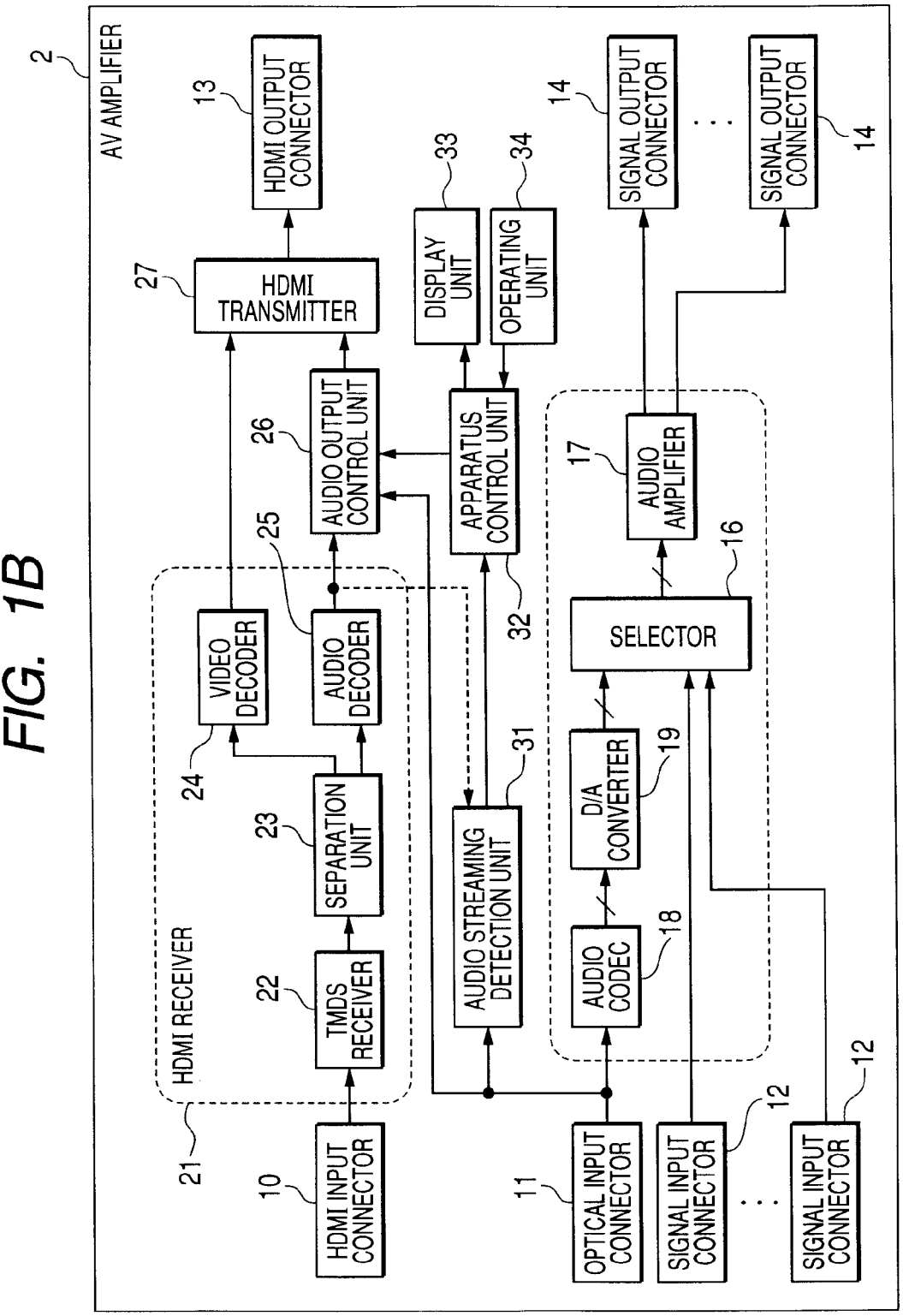
FIG. 1(B) is an apparatus configuration diagram illustrating a configuration of an AV amplifier serving as a relay apparatus according to Embodiment 1 of the present invention.

FIGS. 1(A) and 1(B) are an apparatus configuration diagram illustrating a configuration of an AV amplifier 2 serving as a relay apparatus according to Embodiment 1 of the present invention. The AV amplifier 2 includes, as video and/or audio input terminals, a HDMI (High Definition Multimedia Interface) input connector 10 serving as a streaming input terminal, an optical input connector 11 serving as an audio input terminal, and signal input connectors 12 corresponding to 5.1 channels (six channels). Also, the AV amplifier 2 includes, as video and/or audio output terminals, a HDMI output connector 13 serving as a streaming output terminal and signal output connectors 14 corresponding to 5.1 channels (six channels) serving as an audio output terminal. It is noted that the signal input connectors 12 and signal output connectors 14 may correspond to 7.1 channels or 2.1 channels. The optical input connector 11 may be a connector for coaxial cable.

Inputted to a plurality of the signal input connectors 12 is a 5.1 channel analog audio signal. The 5.1 channel analog audio signal is composed of six audio signals (left front, right front, center, left rear, right rear, and subwoofer). A plurality of the signal input connectors 12 are connected to a selector 16. The selector 16 is connected to an audio amplifier 17. The audio amplifier 17 is connected to a plurality of the signal output connectors 14. The audio amplifier 17 amplifies the 5.1 channel audio signal.

Inputted to the optical input connector 11 is audio data. Examples of the audio data include 5.1 channel audio streaming data, 2-channel audio data and monaural audio data. 5.1 channel audio streaming data can be compressed by use of a scheme such as AAC or DVD-Audio and then optically transmitted by IEC (International Electrotechnical Commission) 61973, or can be converted into the SACD (Super Audio CD) format and then optically transmitted by IEC 61973. 2-channel audio data and monaural audio data can be optically transmitted, for example, by IEC 60958 without being compressed.

The optical input connector 11 is connected to an audio codec 18. The audio codec 18 is connected to a D/A (Digital to Analog) converter 19. The D/A converter 19 is connected to the selector 16. The audio codec 18 generates linear PCM (Pulse Code Modulation) data corresponding to that number of channels based on the audio data, for example. The D/A converter 19 generates an analog audio signal based on the linear PCM (Pulse Code Modulation) data.

Connected to the selector 16 are a plurality of the signal input connectors 12 and the D/A converter 19. The selector 16 selects one from among them. The selector 16 outputs to the audio, amplifier 17 an analog audio signal inputted from the selected one.

Connected to the HDMI input connector 10 and the HDMI output connector 13 are HDMI cables. The HDMI cables perform one-to-one connection between two AV apparatuses. HDMI will be described below.

Figure 2:
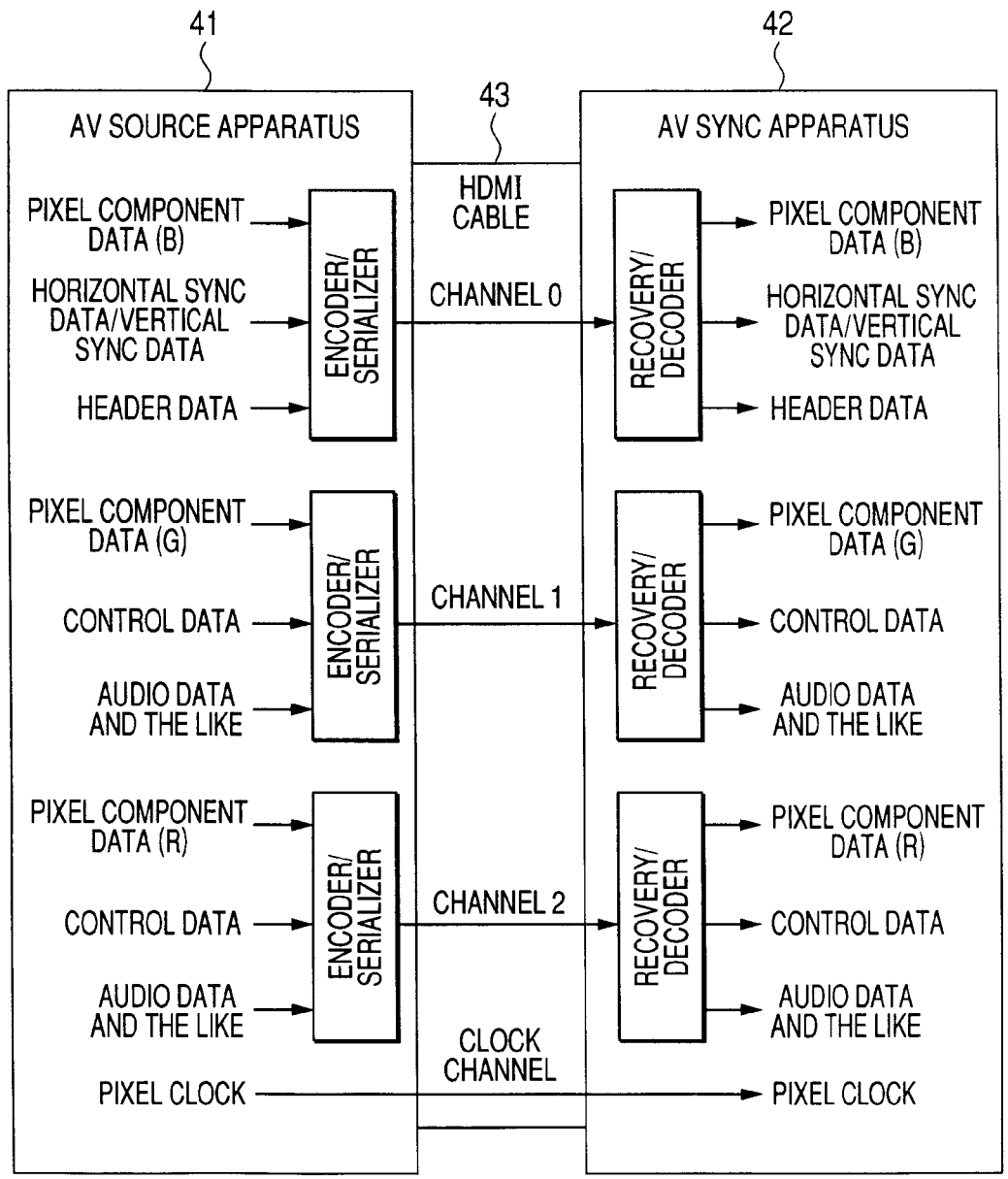
FIG. 2 is a view illustrating a HDMI input-output channel formed by connecting a HDMI-compatible AV source apparatus and AV sync apparatus through a HDMI cable.

FIG. 2 is a view illustrating a HDMI input-output channel formed by connecting a HDMI-compatible AV source apparatus 41 and AV sync apparatus 42 through an HDMI cable 43. When the two AV apparatuses 41 and 42 are connected through the HDMI cable 43, there are formed four TMDS (Transition Minimized Differential Signaling) links between the two AV apparatuses 41 and 42, the four TMDS links being channel 0, channel 1, channel 2 and clock channel. In each channel, data is transmitted by a differential signal.

AV streaming data is transmitted via these four channels. The AV streaming data includes video data and audio data having predetermined content. More specifically, channel 0, channel 1 and channel 2 transmit three pieces of pixel component data corresponding to color components R (red), G (green) and B (blue) of the video data. The clock channel transmits pixel clock.

Figure 3:
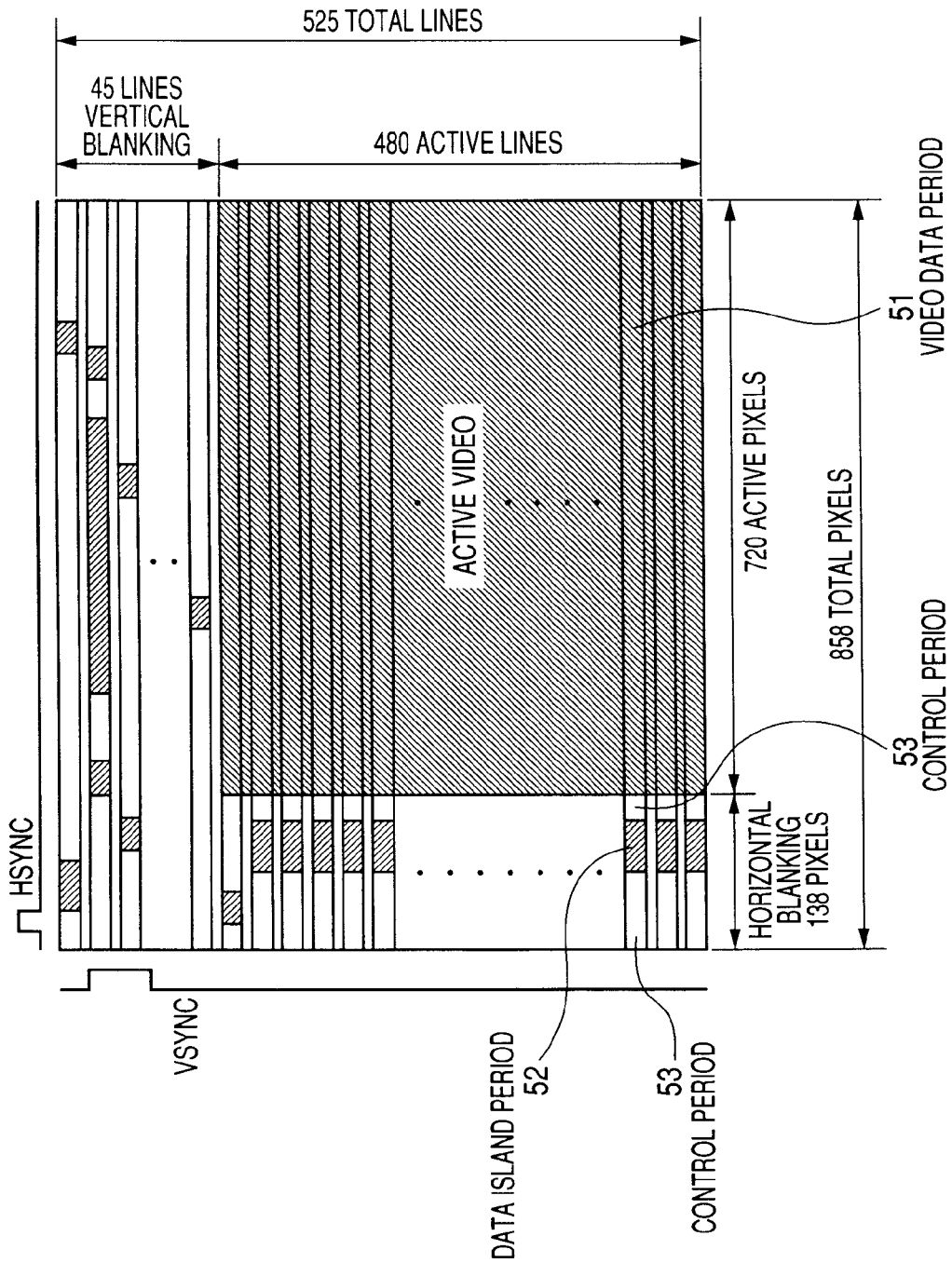
FIG. 3 is a view illustrating a data configuration of one transmission frame being a transmission unit of each HDMI channel.

FIG. 3 is a view illustrating a data configuration of one transmission frame being a transmission unit of each HDMI channel. In each channel, data is transmitted on a per transmission frame basis. The transmission frame has a data size of 525 pixels (vertical) times 858 pixels (horizontal). In part of the transmission frame, there is stored pixel component data of color components corresponding to one frame of video data. Referring to the transmission frame of FIG. 3, frame image data having a size of 480 pixels (vertical) times 720 pixels (horizontal) is stored in pixels of a range indicated by hatching. Also, packet header data, audio data and the like are stored in pixels in which the transmission frame image data is not stored. In HDMI, the pixel region where pixel component data is stored is referred to as a video data period 51. The pixel region where packet header data, audio data and the like are stored is referred to as a data island period 52. The other region is referred to as a control period 53.

Figure 4:
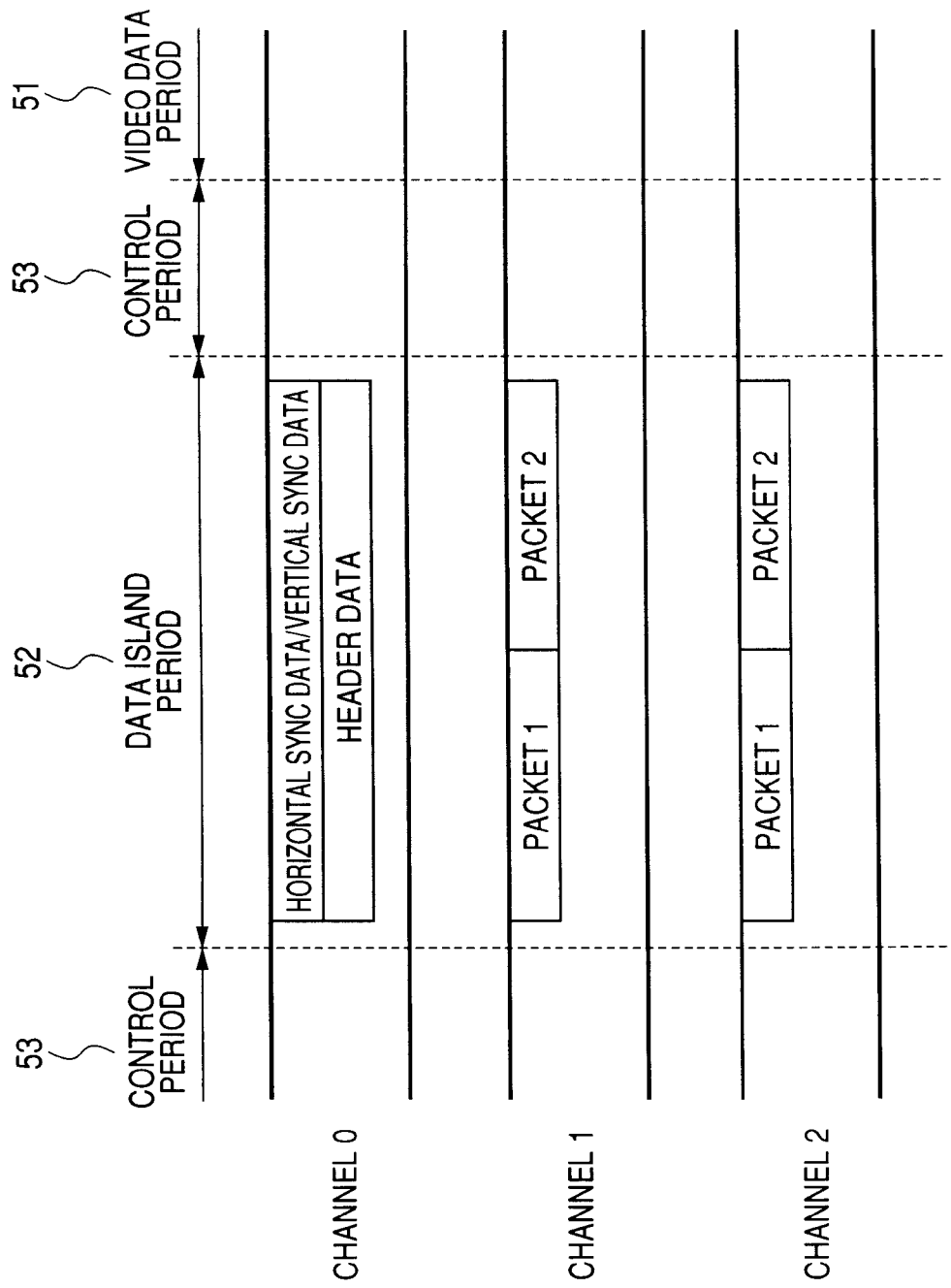
FIG. 4 is a timing chart illustrating the transmitting condition of a plurality of channels using HDMI.

FIG. 4 is a timing chart illustrating the transmitting condition of a plurality of channels using HDMI. Referring to FIG. 4, the control period 53, data island period 52, control period 53 and video data period 51 are drawn from left to right. In this manner, the data island period 52 and video data period 51 are separated by the control period 53.

In the data island period 52, channel 0 transmits synchronization data (HSYNC data and VSYNC data) etc. of transmission frame. Channel 1 and channel 2 transmit a packet 1 and packet 2. Audio data etc. can be stored in the packet 1 and packet 2.

Referring back to FIGS. 1(A) and 1(B), the HDMI input connector 10 of the AV amplifier 2 receives such data corresponding to four channels using HDMI. The HDMI input connector 10 is connected to a HDMI receiver 21 serving as separation means. The HDMI receiver 21 includes a TMDS receiver 22, a separation unit 23, a video decoder 24 and an audio decoder 25. The TMDS receiver 22, separation unit 23, video decoder 24, audio decoder 25 and the like can be implemented by a DSP (Digital Signal Processor) (not illustrated) executing a HDMI input processing program.

The TMDS receiver 22 of the AV amplifier 2 receives plural channels of differential signals using TMDS. The TMDS receiver 22 extracts digital data which has been added to the differential signals for each received channel.

The separation unit 23 decodes the digital data extracted by the TMDS receiver 22 by use of a HDCP (High-bandwidth Digital Content Protection) key used for copyright protection or the like. As a result, AV streaming data is reproduced. The separation unit 23 separates the reproduced AV streaming data into video separation data and audio separation data.

The video decoder 24 generates video data based on the video separation data separated by the separation unit 23. Examples of the video data include video streaming data of MPEG (Moving Picture Experts Group) format.

The audio decoder 25 generates audio data based on the audio separation data separated by the separation unit 23. As illustrated in FIG. 1(A), the audio decoder 25 is connected to an audio output control unit 26. The audio output control unit 26 outputs the received audio data directly, or outputs silent audio data of the same format as that of the received audio data. It is noted that the audio output control unit 26 may be incorporated into part of the HDMI input processing program and thereby implemented as part of the HDMI receiver 21.

As illustrated in FIG. 1(B), the audio decoder 25 is connected to the audio output control unit 26; alternatively, the optical input connector 11 is additionally connected to the audio output control unit 26.

The audio output control unit 26 illustrated in FIG. 1(B) outputs audio data received from the audio decoder 25 directly, or generates audio data having center-channel component data of the audio streaming data inputted from the optical input connector 11. The audio data generated by the audio output control unit 26 may be the audio data received from the audio decoder 25, or may be data of the same format as that of the audio data inputted from the optical input connector 11, or may be data having a different format.

The audio output control unit 26 illustrated in FIG. 1(B) may generate audio data having center-channel component data of the audio streaming data inputted from the audio decoder 25, instead of the audio streaming data inputted from the optical input connector 11. Also, the audio output control unit 26 may generate audio data having rear-channel component data other than center-channel component data, for example. Further, the audio output control unit 26 may be incorporated into part of the HDMI input processing program and thereby implemented as part of the HDMI receiver 21.

Referring to FIGS. 1(A) and 1(B), the video decoder 24 and audio output control unit 26 of the HDMI receiver 21 are connected to a HDMI transmitter 27 serving as output means. The HDMI transmitter 27 is connected to the HDMI output connector 13. When at least one of the video data and audio data is inputted, the HDMI transmitter 27 generates one AV streaming data having that data. The HDMI transmitter 27 outputs the generated AV streaming data to the HDMI output connector 13.

In addition to the above units, the AV amplifier 2 includes an audio streaming detection unit 31 serving as detection means, an apparatus control unit 32, a display unit 33 and an operating unit 34.

The audio streaming detection unit 31 determines whether or not audio streaming data has been inputted to the optical input connector 11. Examples of the audio streaming data include 5.1 channel audio streaming data, 7.1 channel audio streaming data and DTS-CD audio streaming data.

More specifically, the audio streaming detection unit 31 acquires audio data inputted to the optical input connector 11, for example. The audio streaming detection unit 31 determines and detects whether or not the acquired audio data has an audio streaming data format, for example. In this case, when the acquired audio data is, for example, audio data other than PCM data, or DTS-CD data stream data, then the audio streaming detection unit 31 determines that that data is audio streaming data.

In addition, the audio streaming detection unit 31 illustrated in FIG. 1(A) may monitor the audio codec 18 to determine whether or not audio streaming data has been inputted to the optical input connector 11, for example. In this case, when the audio codec 18 is currently performing a decoding operation, the audio streaming detection unit 31 determines that audio streaming data has been inputted to the optical input connector 11.

Alternatively, as illustrated in FIG. 1(B), the audio streaming detection unit 31 may determine whether or not the audio data generated by the audio decoder 25 has an audio streaming data format, for example. Also, the audio streaming detection unit 31 may monitor the audio codec 18 to determine whether or not audio streaming data has been inputted to the optical input connector 11. In this case, when the audio codec 18 is currently performing a decoding operation, the audio streaming detection unit 31 determines that audio streaming data has been inputted to the optical input connector 11.

The apparatus control unit 32 manages and controls the operation of the apparatus. The apparatus control unit 32 varies the operating status of the apparatus based on operating data from the operating unit 34. The apparatus control unit 32 causes the operating status of the apparatus to be displayed on the display unit 33, for example. Particularly, the apparatus control unit 32 of the AV amplifier 2 outputs to the audio output control unit 26 an audio output instruction dependent on the detection result of the audio streaming detection unit 31.

When used, the AV amplifier 2 having the above described configuration is connected between a source apparatus outputting AV streaming data and a reproduction apparatus reproducing the AV streaming data.

Examples of the source apparatus outputting AV streaming data include a DVD (Digital Versatile Disk) player. Also, examples of the source apparatus include a player for next-generation DVD such as Blu-ray Disc and HD (High Definition)-DVD, a MMP (multimedia player) acquiring AV streaming data of IEC 61973 from the Internet and outputting it, and a personal computer.

Examples of the reproduction apparatus reproducing AV streaming data include a HDTV receiver reproducing video data and audio data.

Figure 5:
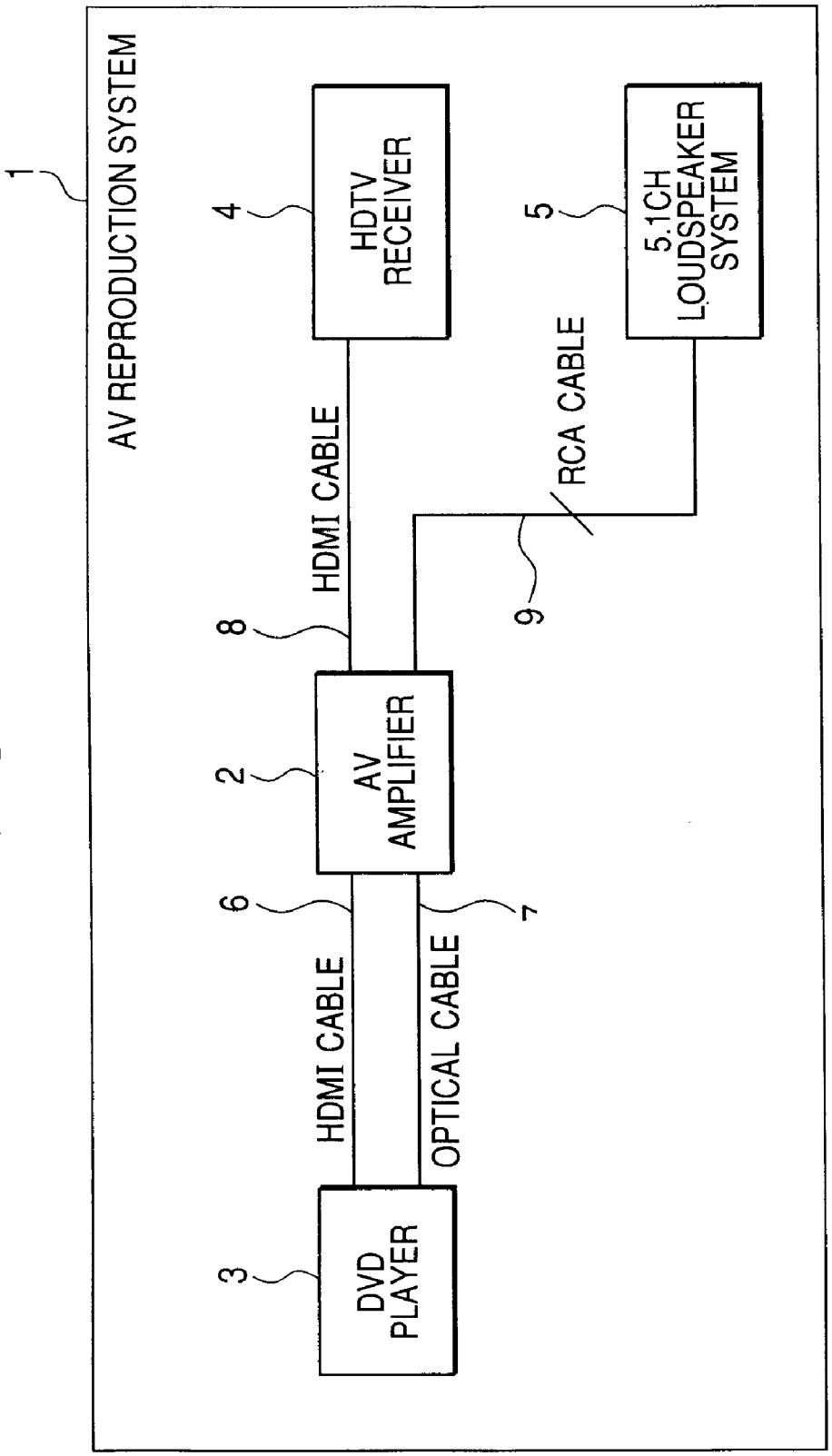
FIG. 5 is a system configuration diagram illustrating an exemplary configuration of an AV reproduction system having the AV amplifier of FIG. 1.

FIG. 5 is a system configuration diagram illustrating an exemplary configuration of an AV reproduction system 1 having the AV amplifier 2 of FIGS. 1(A) and 1(B). The AV reproduction system 1 of FIG. 5 includes a DVD player 3 serving as the AV source apparatus, an AV amplifier 2, a HDTV receiver 4 serving as the AV output apparatus, and a 5.1 channel loudspeaker system 5 serving as the audio output apparatus.

The DVD player 3 and AV amplifier 2 are connected to each other via a HDMI cable 6 and optical cable 7. The HDMI cable 6 is connected to a HDMI input connector 10 of the AV amplifier 2. The optical cable 7 is connected to an optical input connector 11 of the AV amplifier 2.

The AV amplifier 2 and HDTV receiver 4 are connected to each other via another HDMI cable 8. Another HDMI cable 8 is connected to a HDMI output connector 13 of the AV amplifier 2.

The AV amplifier 2 and 5.1 channel loudspeaker system 5 are connected to each other via a plurality of RCA cables 9. The plurality of RCA cables 9 are connected to a plurality of signal output connectors 14 of the AV amplifier 2. The AV amplifier 2 and 5.1 channel loudspeaker system 5 may be connected to each other via a coaxial cable, a twisted pair cable or the like other than the RCA cables 9.

Figure 6:
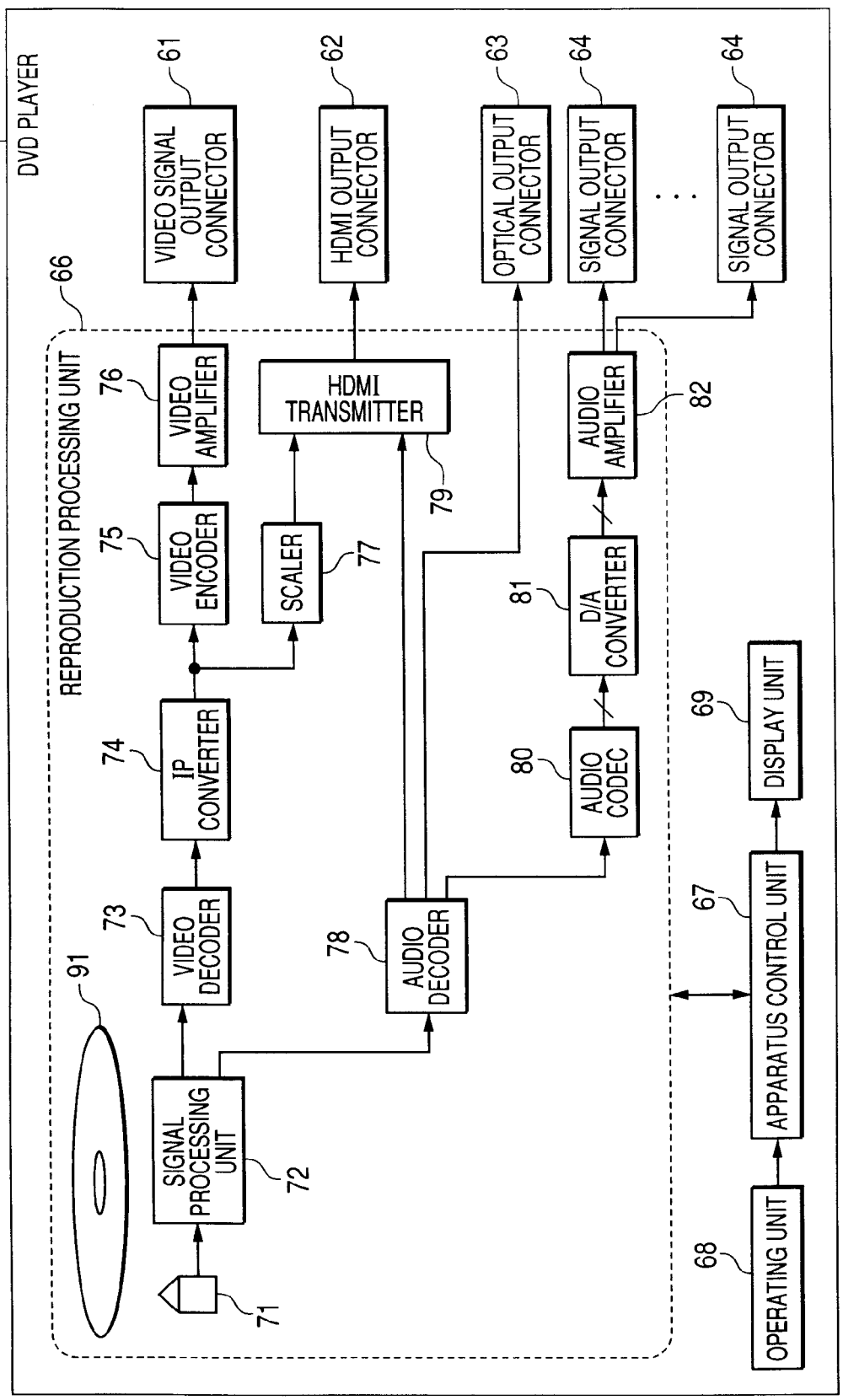
FIG. 6 is an apparatus configuration diagram illustrating a configuration of a DVD player illustrated in FIG. 5.

FIG. 6 is an apparatus configuration diagram illustrating a configuration of the DVD player 3 illustrated in FIG. 5. The DVD player 3 includes, as video and/or audio output terminals, a video signal output connector 61, a HDMI output connector 62, an optical output connector 63 and a plurality of signal output connectors 64. Also, the DVD player 3 includes a reproduction processing unit 66, an apparatus control unit 67, an operating unit 68 and a display unit 69.

The HDMI cable 6 connecting the DVD player 3 and AV amplifier 2 in FIG. 5, is connected to the HDMI output connector 62 of the DVD player 3. Also, the optical cable 7 connecting the DVD player 3 and AV amplifier 2 in FIG. 5 is connected to the optical output connector 63.

The reproduction processing unit 66 includes a drive motor (not illustrated), an optical pickup 71, a signal processing unit 72, a video decoder 73, an IP (Interlace to Progressive) converter 74, a video encoder 75, a video amplifier 76, a scaler 77, an audio decoder 78, a HDMI transmitter 79, an audio codec 80, a D/A converter 81 and an audio amplifier 82.

The drive motor rotationally drives a disk type recording medium 91 having video data and audio data recorded thereon using the DVD format.

The optical pickup 71 scans the disk type recording medium 91 rotationally driven; and the optical pickup 71 reads data recorded on the disk type recording medium 91.

The signal processing unit 72 generates video separation data and audio separation data based on the data read by the optical pickup 71.

The IP converter 74 generates progressive video data based on interlaced video data.

The video encoder 75 generates a predetermined analog video signal based on the video data. Examples of the analog video signal include NTSC (National Television Standards Committee) signal and PAL (Phase Alternation Line) signal. The video encoder 75 may generate a digital video signal such as a D3 or D4 signal.

The video amplifier 76 amplifies the video signal. The video amplifier 76 is connected to the video signal output connector 61; the video amplifier 76 outputs the amplified analog video signal to the video signal output connector 61.

The scaler 77 converts the resolution of each progressive video data frame. More specifically, the scaler 77 converts a progressive frame having 480 effective scanning lines into a progressive frame having 720 or 1080 effective scanning lines.

Constituent components of the DVD player 3 other than the above described ones have the same function as one having the same reference number in the AV amplifier 2 illustrated in FIG. 1, and hence an explanation of the constituent components is omitted.

Figure 7:
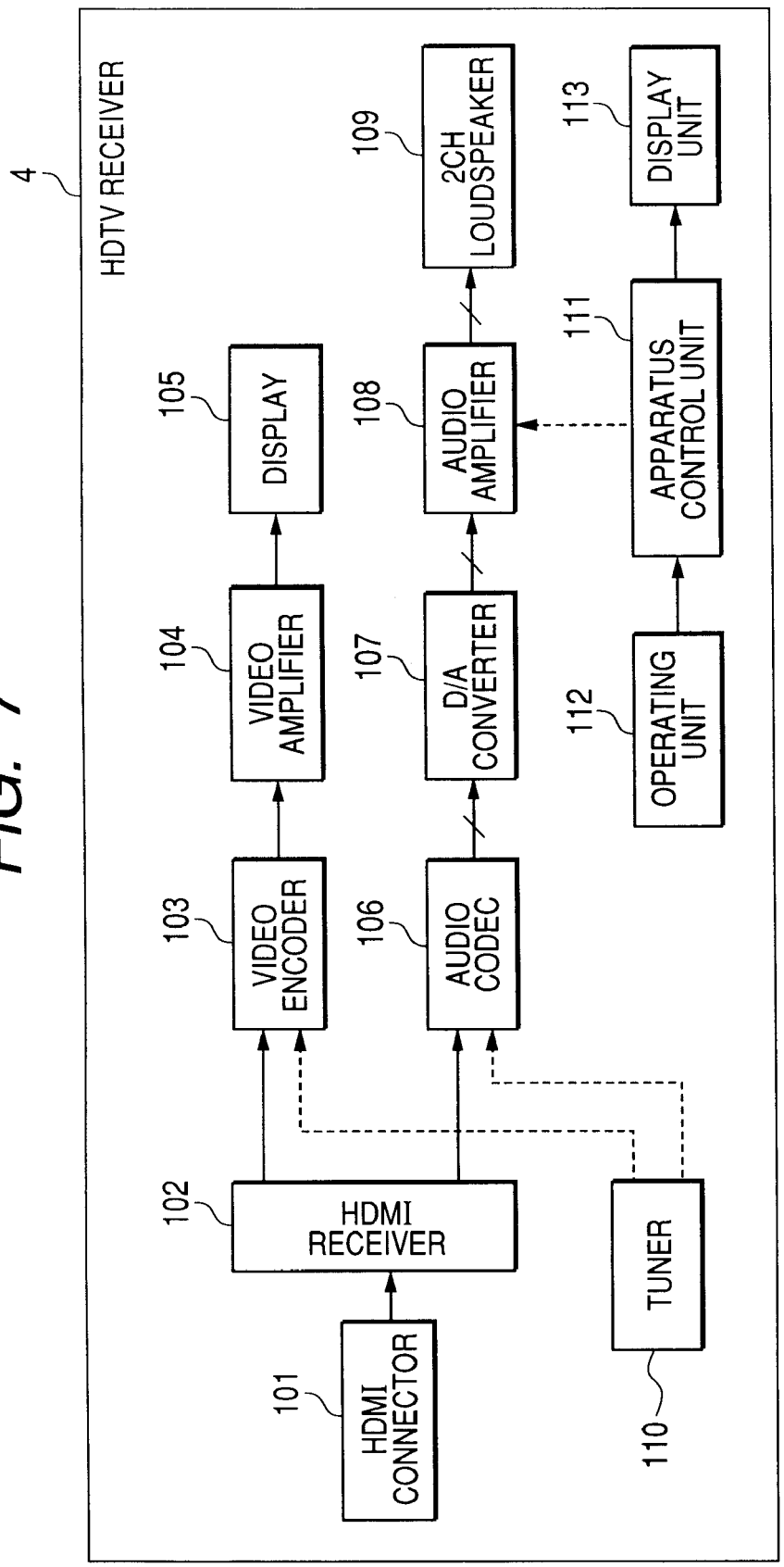
FIG. 7 is an apparatus configuration diagram illustrating a configuration of a HDTV receiver illustrated in FIG. 5.

FIG. 7 is an apparatus configuration diagram illustrating a configuration of the HDTV receiver 4 illustrated in FIG. 5. The HDTV receiver 4 includes a HDMI input connector 101 as a video and audio input terminal. The HDTV receiver 4 includes a HDMI receiver 102, a video encoder 103, a video amplifier 104, a display 105, an audio codec 106, a D/A converter 107, an audio amplifier 108, a 2-channel loudspeaker 109, a tuner 110, an apparatus control unit 111, an operating unit 112 and a display unit 113.

The display 105 displays pictures based on an analog video signal.

The 2-channel loudspeaker 109 outputs sounds based on a 2-channel analog audio signal. When the audio signal is monaural, the 2-channel loudspeaker 109 outputs the same sound from the two loudspeakers.

The tuner 110 receives HDTV broadcast radio waves; and the tuner 110 extracts video data, audio data and the like from the received HDTV broadcast radio waves. The tuner 110 outputs the extracted video data to the video encoder 103 and outputs the extracted audio data to the audio codec 106, for example.

The apparatus control unit 111 outputs, based on operation data from the operating unit 112, a muting instruction, cancellation instruction thereof or the like to the audio amplifier 108. When receiving the muting instruction, the audio amplifier 108 does not output any audio signal; the audio amplifier 108 does not output any audio signal based on audio data from the tuner 110. When receiving the muting cancellation instruction, the audio amplifier 108 starts outputting an audio signal.

Constituent components of the HDTV receiver 4 other than the above described ones have the same function as one having the same reference number in the AV amplifier 2 illustrated in FIG. 1 or the DVD player 3 illustrated in FIG. 6, and hence an explanation of the constituent components is omitted. Connected to the audio amplifier 108 are the 2-channel loudspeakers 109. Accordingly, when audio data of three or more channels is inputted, the audio codec 106 or the D/A converter 107 down-mixes the audio data to 2-channel data, or performs decoding to generate 2-channel audio data based on the audio data. Also, when audio data of one channel is inputted, the audio codec 106 or the D/A converter 107 performs decoding to supply the same audio signal to the 2-channel loudspeakers 109.

The reproducing operation of a disk-type recording medium 91 having video and audio content data recorded thereon using the DVD format will now be described by taking as an example, the AV reproduction system 1 having the connection illustrated in FIG. 5. In the following description, assume that the disk-type recording medium 91 has recorded thereon 5.1 channel audio streaming data as the audio data.

As illustrated in FIG. 6, the disk-type recording medium 91 is placed in the DVD player 3. The drive motor (not illustrated) of the DVD player 3 rotationally drives the disk-type recording medium 91. The optical pickup 71 reads data from the disk-type recording medium 91 rotationally driven. The data read by the optical pickup 71 is inputted to the signal processing unit 72. The signal processing unit 72 generates video separation data and audio separation data based on the supplied data.

The video separation data separated/generated by the signal processing unit 72 is inputted to the video decoder 73. The video decoder 73 generates video data based on the supplied video separation data. The IP converter 74 converts interlaced video data into progressive video data. The progressive video data generated by the IP converter 74 is inputted to the video encoder 75 and scaler 77. The scaler 77 converts the resolution of each progressive video data frame. The video data with the resolution converted by the scaler 77 is inputted to the HDMI transmitter 79.

Also, the video encoder 75 generates a predetermined analog video signal based on the video data. The AV amplifier 76 amplifies the analog video signal. The analog video signal amplified by the AV amplifier 76 is outputted to the video signal output connector 61.

The audio separation data separated/generated by the signal processing unit 72 is inputted to the audio decoder 78. The audio decoder 78 generates audio data based on the audio separation data. Since 5.1 channel audio streaming data is recorded on the disk-type recording medium 91, the audio decoder 78 generates the 5.1 channel audio streaming data. The 5.1 channel audio streaming data generated by the audio decoder 78 is inputted to the HDMI transmitter 79, optical output connector 63 and audio codec 80.

In this case, the audio decoder 78 of the DVD player 3 may supply audio data of different formats to the HDMI transmitter 79, optical output connector 63 and audio codec 80. For example, the audio decoder 78 of the DVD player 3 may supply audio data of the SPDIF format to the HDMI transmitter 79, and 5.1 channel audio streaming data to the optical output connector 63 and audio codec 80. In this case, the audio decoder 78 of the DVD player 3 down-mixes the 5.1 channel audio streaming data to generate audio data of the SPDIF format. The audio data of the SPDIF format thus generated is audio data based on the 5.1 channel audio streaming data.

When receiving video data from the scaler 77 and at the same time, receiving 5.1 channel audio streaming data from the audio decoder 78, the HDMI transmitter 79 generates AV streaming data having the video data and 5.1 channel audio streaming data; and the HDMI transmitter 79 outputs the generated AV streaming data to the HDMI output connector 62.

The audio codec 80 decodes the 5.1 channel audio streaming data supplied from the audio decoder 78 to generate PCM data corresponding to 5.1 channels. The D/A converter 81 converts the PCM data corresponding to 5.1 channels generated by the audio codec 80 into audio signals corresponding to 5.1 channels; and the D/A converter 81 outputs the generated audio signals corresponding to 5.1 channels to a plurality of the signal input connectors 64.

In a manner described above, the DVD player 3 performs reproduction of the disk-type recording medium 91 having recorded thereon video data and 5.1 channel audio streaming data. The DVD player 3 outputs AV streaming data having the video data and 5.1 channel audio streaming data recorded on the disk-type recording medium 91 via the HDMI output connector 62; the DVD player 3 outputs the 5.1 channel audio streaming data recorded on the disk-type recording medium 91 via the optical output connector 63; the DVD player 3 outputs the audio signals corresponding to 5.1 channels based on the 5.1 channel audio streaming data recorded on the disk-type recording medium 91 via a plurality of the signal output connectors 64.

The HDMI output connector 62 of the DVD player 3 is, as illustrated in FIG. 5, connected to the AV amplifier 2 via the HDMI cable. The optical output connector 63 of the DVD player 3 is connected to the AV amplifier 2 via the optical cable 7.

As illustrated in FIGS. 1(A) and 1(B), the audio codec 18 of the AV amplifier 2 decodes the 5.1 channel audio streaming data inputted to the optical input connector 11; and the audio codec 18 generates PCM data corresponding to 5.1 channels. The D/A converter 19 generates audio signals corresponding to 5.1 channels based on the PCM data corresponding to 5.1 channels generated by the audio codec 18.

The selector 16 preliminarily selects the D/A converter 19 in accordance with an instruction from the apparatus control unit 32, for example, based on an operation of operation keys (not illustrated) in the operating unit 34. The selector 16 outputs to the audio amplifier 17 the audio signals corresponding to 5.1 channels received from the D/A converter 19. The audio amplifier 17 amplifies the audio signals corresponding to 5.1 channels received from the selector 16 and outputs them to a plurality of the signal output connectors 14.

A plurality of the analog audio output connectors are, as illustrated in FIG. 5, connected to the 5.1 channel loudspeaker system 5 via the RCA cable 9. The 5.1 channel loudspeaker system 5 outputs sounds based on the audio signals corresponding to 5.1 channels supplied from a plurality of the signal output connectors 14 of the AV amplifier 2; when the audio signals corresponding to 5.1 channels are supplied from a plurality of the signal output connectors 14 of the AV amplifier 2, the 5.1 channel loudspeaker system 5 outputs sounds from all the loudspeakers. As a result, the 5.1 channel loudspeaker system 5 can output high-quality sounds based on the 5.1 channel audio streaming data recorded on the disk-type recording medium 91.

Also, as illustrated in FIGS. 1(A) and 1(B), the TMDS receiver 22 of the AV amplifier 2 receives four-channel transmission frames inputted to the HDMI input connector 10. The TMDS receiver 22 extracts digital data from the received transmission frame. The separation unit 23 decodes the digital data extracted by the TMDS receiver 22 by use of a HDCP key and separates video separation data and audio separation data. The video decoder 24 generates video data based on the video separation data separated by the separation unit 23; and the video decoder 24 outputs the generated video data to the HDMI transmitter 27.

The audio separation data separated by the separation unit 23 is inputted to the audio decoder 25. The audio decoder 25 generates 5.1 channel audio streaming data based on the audio separation data. The audio data generated by the audio decoder 25 is inputted to the audio output control unit 26.

The audio streaming detection unit 31 of the AV amplifier 2 determines whether or not audio streaming data has been inputted to the optical input connector 11. In this case, inputted to the optic input terminal 11 is 5.1 channel audio streaming data; the audio streaming detection unit 31 detects the audio streaming data.

As illustrated in FIG. 1(A), when the audio streaming detection unit 31 detects audio streaming data, the apparatus control unit 32 of the AV amplifier 2 outputs an audio output prohibiting instruction to the audio output control unit 26. Upon receipt of the audio output prohibiting instruction, the audio output control unit 26 outputs silent audio data of the same format as that of the inputted audio data; when 5.1 channel audio streaming data is inputted to the audio output control unit 26, the audio output control unit 26 outputs silent 5.1 channel audio streaming data of the same format as that of that 5.1 channel audio streaming data.

In the case of FIG. 1(A), the video data generated by the video decoder 24 of the HDMI receiver 21 and the silent 5.1 channel audio streaming data outputted by the audio output control unit 26 are inputted to the HDMI transmitter 27. The HDMI transmitter 27 generates AV streaming data having the video data and silent 5.1 channel audio streaming data and outputs them to the HDMI output connector 13.

As illustrated in FIG. 5, connected via another HDMI cable 8 to the HDMI output connector 13 of the AV amplifier 2 is the HDMI input connector 101 of the HDTV receiver 4. As illustrated in FIG. 7, in the case of FIG. 1(A), the HDMI input connector 101 of the HDTV receiver 4 is connected to the HDMI receiver 102. The HDMI receiver 102 extracts digital data which has been added to a plurality of differential signals received, and decodes the digital data by use of a HDCP key to generate video data and silent 5.1 channel audio streaming data.

Alternatively, when the audio streaming detection unit 31 detects audio streaming data, as illustrated in FIG. 1(B), the apparatus control unit 32 of the AV amplifier 2 outputs to the audio output control unit 26 an instruction for outputting center-channel sound. On receipt of the instruction for outputting center-channel sound, the audio output control unit 26 generates audio data having center-channel component data of the audio streaming data inputted from the optical input connector 11 and outputs the audio data.

In the case of FIG. 1(B), the video data generated by the video decoder 24 of the HDMI receiver 21 and the center-channel component audio data outputted from the audio output control unit 26 are inputted to the HDMI transmitter 27. The HDMI transmitter 27 generates AV streaming data having the video data and center-channel component audio data and outputs the AV streaming data to the HDMI output connector 13.

As illustrated in FIG. 5, connected via another HDMI cable 8 to the HDMI output connector 13 of the AV amplifier 2 is the HDMI input connector 101 of the HDTV receiver 4. As illustrated in FIG. 7, the HDMI input connector 101 of the HDTV receiver 4 is connected to the HDMI receiver 102. In the case of FIG. 1(B), the HDMI receiver 102 extracts digital data which has been added to a plurality of differential signals received, and decodes the digital data by use of a HDCP key to generate video data and center-channel component audio data.

The HDMI receiver 102 of the HDTV receiver 4 supplies the generated video data to the video encoder 103. The video encoder 103 generates a predetermined analog video signal based on the supplied video data. The video amplifier 104 amplifies the video signal generated by the video encoder 103 and supplies the video signal to the display 105. The display 105 displays pictures based on the video signal. Accordingly, high-quality pictures based on the data recorded on the disk-type recording medium 91 are displayed on the display 105 of the HDTV receiver 4.

In the case, illustrated in FIG. 1(A), the HDMI receiver 102 of the HDTV receiver 4 supplies the generated silent 5.1 channel audio streaming data to the audio codec 106. The audio codec 106 decodes the supplied silent 5.1 channel audio streaming data and further applies down-mixing etc. to the data to generate 2-channel linear PCM data. The D/A converter 107 generates silent audio signals corresponding to two channels based on the silent linear PCM data corresponding to two channels. The audio amplifier 108 amplifies the silent audio signals corresponding to two channels and supplies them to the 2-channel loudspeaker 109. Inputted to the 2-channel loudspeaker 109 are silent audio signals corresponding to two channels, so the 2-channel loudspeaker 109 outputs no sound.

In the case illustrated in FIG. 1(B), the HDMI receiver 102 of the HDTV receiver 4 supplies the generated center-channel component audio data to the audio codec 106. The audio codec 106 decodes the supplied center-channel component audio data to generate linear PCM data of center channel. The D/A converter 107 generates an audio signal of center channel based on the linear PCM data of center channel. The audio amplifier 108 amplifies the audio signal of center channel and supplies it to the 2-channel loudspeaker 109. The 2-channel loudspeaker 109 outputs center channel sound based on the audio signal of center channel.

In the above description, there is explained the case where 5.1 channel audio streaming data is recorded on the disk-type recording medium 91. As another example, 2-channel audio data (L+R) may be recorded on the disk-type recording medium 91. When 2-channel audio data is recorded on the disk-type recording medium 91, the DVD player 3 outputs 2-channel audio data from the optical output connector 63, and also outputs audio signals corresponding to two channels from part of a plurality of the signal output connectors 64.

In this case, the audio streaming detection unit 31 of the AV amplifier 2 does not detect any audio streaming data. Thus, the apparatus control unit 32 of the AV amplifier 2 outputs an audio output instruction. The audio output control unit 26 of the AV amplifier 2 outputs the received audio data directly to the HDMI transmitter 27. The HDMI transmitter 27 generates AV streaming data having the video data supplied from the video decoder 24 and the 2-channel audio data fed by the audio output control unit 26, and outputs the AV streaming data to the HDMI output connector 13.

Also, the HDMI receiver 102 of the HDTV receiver 4 generates sounded 2-channel audio data and supplies the audio data to the audio codec 106. The audio codec 106 generates PCM data corresponding to two channels. The D/A converter 107 converts the PCM data corresponding to two channels into audio signals corresponding to two channels. The audio amplifier 108 amplifies the audio signals corresponding to two channels and supplies the audio signals to the 2-channel loudspeaker 109. The 2-channel loudspeaker 109 outputs sounds based on the 2-channel audio data recorded on the disk-type recording medium 91.

As described above, according to the present embodiment 1, as illustrated in FIG. 1(A), in the AV amplifier 2, when 5.1 channel audio streaming data is inputted to the optical input connector 11, the audio streaming detection unit 31 detects this and the apparatus control unit 32 outputs an audio output prohibiting instruction to the audio output control unit 26. The audio output control unit 26 generates silent 5.1 channel audio streaming data of the same format as that of the 5.1 channel audio streaming data inputted thereto and supplies the audio streaming data to the HDMI transmitter 27.

Consequently, even when the HDTV receiver 4 connected to the HDMI output connector 13 of the AV amplifier 2 receives the AV streaming data from the AV amplifier 2 and performs video and audio reproduction based on the received data, the HDTV receiver 4 output no sound; the HDTV receiver 4 outputs no unwanted sound. That is, the HDTV receiver 4 does not interrupt high-quality sound space formed by the 5.1 channel loudspeaker system 5 connected to the AV amplifier 2; and the viewer of the AV reproduction system 1 can enjoy the high-quality sound space formed by the 5.1 channel loudspeaker system 5.

Alternatively, according to the present embodiment 1, as illustrated in FIG. 1(B), in the AV amplifier 2, when 5.1 channel audio streaming data is inputted to the optical input connector 11, the audio streaming detection unit 31 detects this and the apparatus control unit 32 instructs the audio output control unit 26 to output center-channel component audio data. The audio output control unit 26 generates audio data having a center-channel component of the 5.1 channel audio streaming data inputted from the optical input connector 11 and outputs the audio data to the HDMI transmitter 27.

Consequently, even when the HDTV receiver 4 connected to the HDMI output connector 13 of the AV amplifier 2 receives the AV streaming data from the AV amplifier 2 and performs video and audio reproduction based on the received data, the HDTV receiver 4 outputs center-channel sound. That is, the HDTV receiver 4 outputs the same sound as center-channel sound outputted from a center loudspeaker (not illustrated) of the 5.1 channel loudspeaker system. Since the HDTV receiver 4 is arranged at the center (substantially the same position as that of the center loudspeaker) between the left front and right front loudspeakers, when the HDTV receiver 4 outputs the same sound as that of the center loudspeaker, the HDTV receiver 4 outputs no unwanted sound. That is, the HDTV receiver 4 does not interrupt the high-quality sound space formed by the 5.1 channel loudspeaker system connected to the AV amplifier 2; and the viewer of the AV reproduction system 1 can enjoy the high-quality sound space formed by the 5.1 channel loudspeaker system 5.

Also, whenever enjoying 5.1 channel audio streaming data of the disk-type recording medium 91, the viewer is not required to manipulate the operating unit 112 of the HDTV receiver 4 to set sound mute in the HDTV receiver 4. Also, after enjoying the 5.1 channel audio streaming data of the disk-type recording medium 91, the viewer is not required to manipulate the operating unit 112 of the HDTV receiver 4 to set sound mute cancellation in the HDTV receiver 4. When enjoying 2-channel audio data of the disk-type recording medium 91 or enjoying HDTV broadcast, the viewer is not required to perform a sound mute cancellation operation.

Embodiment 2

Figure 8:
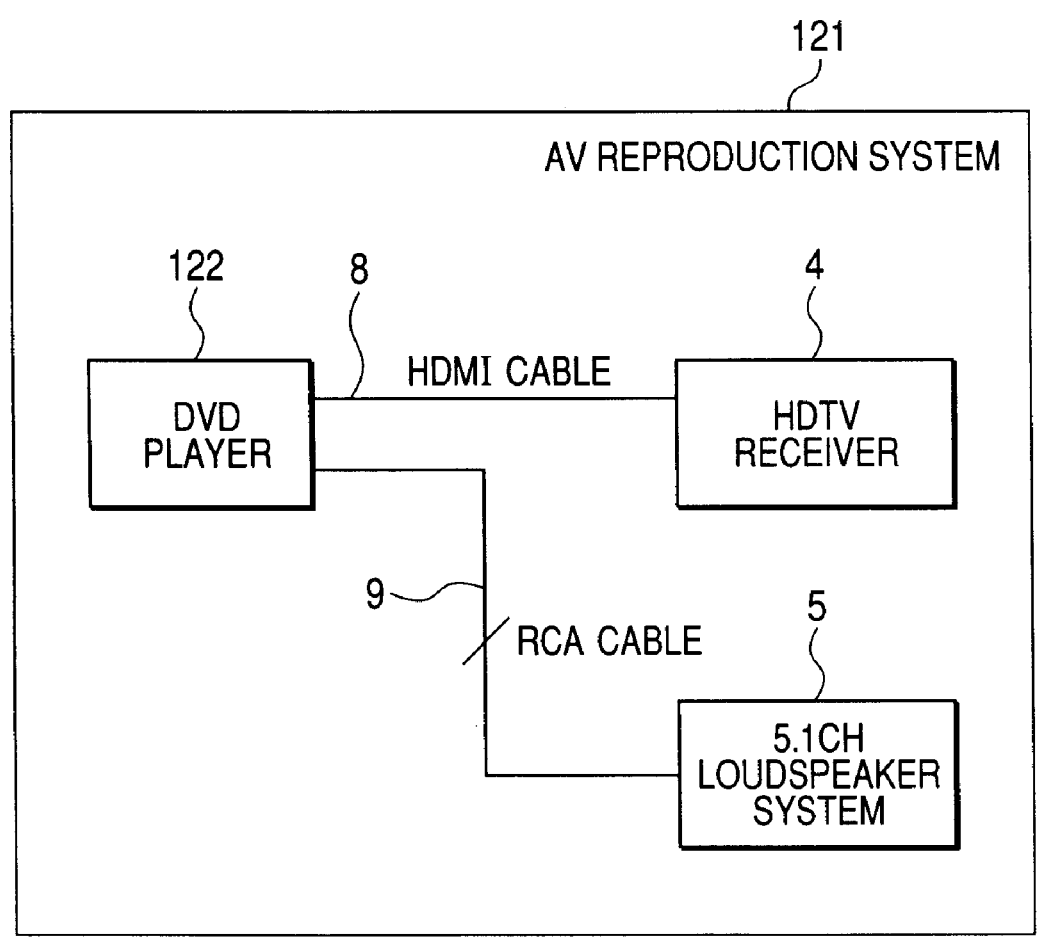
FIG. 8 is a system configuration diagram illustrating an example of AV reproduction system according to Embodiment 2 of the present invention.

FIG. 8 is a system configuration diagram illustrating an example of AV reproduction system 121 according to Embodiment 2 of the present invention. The AV reproduction system 121 of FIG. 8 includes a DVD player 122 serving as an AV source apparatus, a HDTV receiver 4 serving as an AV output apparatus, and a 5.1 channel loudspeaker system 5 serving as an audio output apparatus. The DVD player 122 and HDTV receiver 4 are connected via a HDMI cable 8. The DVD player 122 and 5.1 channel loudspeaker system 5 are connected via a plurality of RCA cables 9. In this case, an optical output connector 63 serving as an audio output terminal of the DVD player 122 may be connected via an optical cable to the 5.1 channel loudspeaker system 5.

Figure 9:
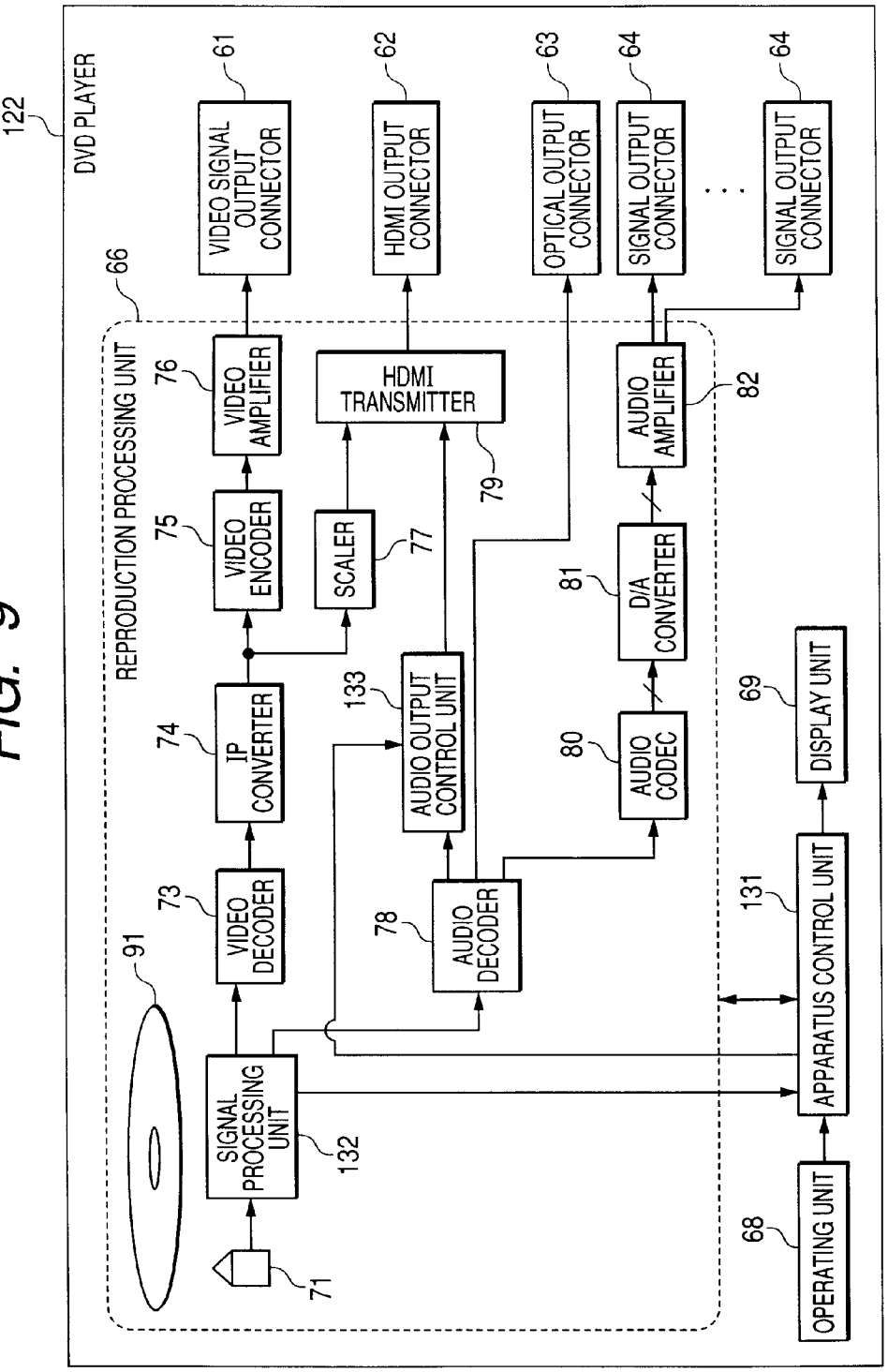
FIG. 9 is an apparatus configuration diagram illustrating a configuration of a DVD player in FIG. 8.

FIG. 9 is an apparatus configuration diagram illustrating a configuration of the DVD player 122 in FIG. 8. The DVD player 122 includes, as video and/or audio output terminals, a video signal output connector 61, a HDMI output connector 62 serving as a streaming output terminal, an optical output connector 63 and a plurality of signal output connectors 64 serving as an audio output terminal. Also, the DVD player 122 includes a reproduction processing unit 66, an apparatus control unit 131, an operating unit 68 and a display unit 69.

The reproduction processing unit 66 of the DVD player 122 includes a drive motor (not illustrated), an optical pickup 71, a signal processing unit 132 serving as separation means, a video decoder 73, an IP converter 74, a video encoder 75, a video amplifier 76, a scaler 77, an audio decoder 78, an audio output control unit 133, a HDMI transmitter 79 serving as output means, an audio codec 80, a D/A converter 81 and an audio amplifier 82.

The signal processing unit 132 determines based on data read by the optical pickup 71 whether or not the audio data is audio streaming data. The signal processing unit 132 determines that the audio data is audio streaming data, for example, when the audio data is compressed one. The signal processing unit 132 is connected to the apparatus control unit 131; the signal processing unit 132 outputs the audio streaming data detection result to the apparatus control unit 131.

The apparatus control unit 131 is connected to the audio output control unit 133. The apparatus control unit 131 outputs to the audio output control unit 133 an audio output instruction dependent on the detection result of the signal processing unit 132. When the signal processing unit 132 detects audio streaming data, the apparatus control unit 131 outputs an audio output prohibiting instruction to the audio output control unit 133.

The audio output control unit 133 is connected between the audio decoder 78 and HDMI transmitter 79. Inputted to the audio output control unit 133 is audio data generated by the audio decoder 78. The audio output control unit 133 outputs the received audio data directly to the HDMI transmitter 79, or outputs to the HDMI transmitter 79, silent audio data of the same format as that of the received audio data.

An alternative configuration is described below. The apparatus control unit 131 is connected to the audio output control unit 133. The apparatus control unit 131 outputs to the audio output control unit 133 an audio output instruction dependent on the detection result of the signal processing unit 132. When the signal processing unit 132 detects audio streaming data, the apparatus control unit 131 outputs a center-channel audio output instruction to the audio output control unit 133.

The audio output control unit 133 is connected between the audio decoder 78 and HDMI transmitter 79. Inputted to the audio output control unit 133 is audio data generated by the audio decoder 78. The audio output control unit 133 outputs the received audio data directly to the HDMI transmitter 79, or outputs to the HDMI transmitter 79, audio data having center-channel component data of the audio streaming data inputted from the audio decoder 78.

Constituent components of the AV reproduction system 121 according to Embodiment 2 other than the above described ones have the same function as one having the same reference number in the AV reproduction system 1 according to Embodiment 1 illustrated in FIG. 1A, and hence the same reference numerals are applied thereto and an explanation of the constituent components is omitted. Also, the configuration of the HDTV receiver 4 of the AV reproduction system 121 according to Embodiment 2 is similar to that of Embodiment 1 illustrated in FIG. 7, and hence an illustration and explanation of the configuration of the HDTV receiver 4 are omitted.

The reproducing operation of a disk-type recording medium 91 having video and audio content data recorded thereon using the DVD format will now be described by taking as an example, the AV reproduction system 121 having the connection illustrated in FIG. 8. In the following description, assume that the disk-type recording medium 91 has recorded thereon 5.1 channel audio streaming data as the audio data.

As illustrated in FIG. 9, a drive motor (not illustrated) of the DVD player 122 rotationally drives the disk-type recording medium 91. The optical pickup 71 reads data from the disk-type recording medium 91 rotationally driven. The data read by the optical pickup 71 is inputted to the signal processing unit 132. The signal processing unit 132 generates video separation data and audio separation data based on the supplied data.

The video decoder 73 of the DVD player 122 decodes the video separation data separated by the signal processing unit 132 to generate video data. The IP converter 74 converts the video data into progressive video data. The scaler 77 converts the resolution of the video data and supplies the video data to the HDMI transmitter 79.

The audio decoder 78 of the DVD player 122 decodes the audio separation data separated by the signal processing unit 132 to generate audio data. Since 5.1 channel audio streaming data is recorded on the disk-type recording medium 91, the audio decoder 78 generates the 5.1 channel audio streaming data. The audio decoder 78 supplies the generated 5.1 channel audio streaming data to the audio output control unit 133, optical output connector 63 and audio codec 80.

The audio codec 80 of the DVD player 122 decodes the 5.1 channel audio streaming data to generate PCM data corresponding to 5.1 channels. The D/A converter 81 generates audio signals corresponding to 5.1 channels. The audio amplifier 82 amplifies the audio signals corresponding to 5.1 channels generated by the D/A converter 81 and outputs the audio signals to a plurality of the signal output connectors 64.

A plurality of the signal output connectors 64 of the DVD player 122 are, as illustrated in FIG. 8, connected via a plurality of RCA cables 9 to the 5.1 channel loudspeaker system 5. The 5.1 channel loudspeaker system 5 outputs sounds based on the audio signals corresponding to 5.1 channels supplied from the DVD player 122. Accordingly, the 5.1 channel loudspeaker system 5 can output high-quality sounds based on the 5.1 channel audio streaming data recorded on the disk-type recording medium 91.

Also, the signal processing unit 132 of the DVD player 122 generates video separation data and audio separation data and at the same time, determines based on the data read by the optical pickup 71 whether or not the audio data is audio streaming data. Recorded on the disk-type recording medium 91 is 5.1 channel audio streaming data; the signal processing unit 132 outputs the detection of audio streaming data to the apparatus control unit 131.

When the signal processing unit 132 detects audio streaming data, the apparatus control unit 131 of the DVD player 122 outputs an audio output prohibiting instruction to the audio output control unit 133. Upon receipt of the audio output prohibiting instruction, the audio output control unit 133 outputs silent audio data of the same format as that of the inputted audio data; when 5.1 channel audio streaming data is inputted to the audio output control unit 133, the audio output control unit 133 outputs silent 5.1 channel audio streaming data of the same format as that of that 5.1 channel audio streaming data. The silent 5.1 channel audio streaming data is inputted to the HDMI transmitter 79.

The silent 5.1 channel audio streaming data from the audio output control unit 133 is inputted to the HDMI transmitter 79 of the DVD player 122, along with the video data from the scaler 77; and the HDMI transmitter 79 generates AV streaming data having the video data and the silent 5.1 channel audio streaming data and outputs the AV streaming data to the HDMI output connector 62.

As illustrated in FIG. 8, connected via the HDMI cable 8 to the HDMI output connector 62 of the DVD player 122 is the HDTV receiver 4. The HDMI receiver 102 of the HDTV receiver 4 extracts digital data which has been added to a plurality of differential signals received from the DVD player 122, and decodes the digital data by use of a HDCP key to generate video data and silent 5.1 channel audio streaming data.

Alternatively, when the signal processing unit 132 detects audio streaming data, the apparatus control unit 131 of the DVD player 122 outputs to the audio output control unit 133 an instruction for outputting center-channel sound. On receipt of the instruction for outputting center-channel sound, the audio output control unit 133 outputs to the HDMI transmitter 79, audio data having center-channel component data of the audio data inputted from the audio decoder 78, for example. The center-channel audio data is inputted to the HDMI transmitter 79.

The center-channel audio data from the audio output control unit 133 is inputted to the HDMI transmitter 79 of the DVD player 122, along with the video data from the scaler 77. The HDMI transmitter 79 generates AV streaming data having the video data and center-channel audio data and outputs the AV streaming data to the HDMI output connector 62.

As illustrated in FIG. 8, connected via the HDMI cable 8 to the HDMI output connector 62 of the DVD player 122 is the HDTV receiver 4. The HDMI receiver 102 of the HDTV receiver 4 extracts digital data which has been added to a plurality of differential signals received, and decodes the digital data by use of a HDCP key to generate video data and center-channel audio data.

The HDMI receiver 102 of the HDTV receiver 4 supplies the generated video data to the video encoder 103. The video encoder 103 generates a predetermined analog video signal based on the supplied video data; and the video amplifier 104 amplifies the video signal generated by the video encoder 103 and supplies the video signal to the display 105. The display 105 displays pictures based on the video signal. Accordingly, displayed on the display 105 of the HDTV receiver 4 are high-quality pictures based on the data recorded on the disk-type recording medium 91.

Also, the HDMI receiver 102 of the HDTV receiver 4 supplies the generated silent 5.1 channel audio streaming data to the audio codec 106. The audio codec 106 generates silent linear PCM data corresponding to 5.1 channels based on the supplied audio data. The D/A converter 107 generates silent audio signals corresponding to 5.1 channels based on the silent linear PCM data corresponding to 5.1 channels. The audio amplifier 108 amplifies the silent audio signals corresponding to 5.1 channels and supplies the audio signals to the 2-channel loudspeaker 109. Inputted to the 2-channel loudspeaker 109 are silent audio signals corresponding to 5.1 channels; thus the 2-channel loudspeaker 109 outputs no sound.

As described above, according to the present embodiment 2, in the DVD player 122, when 5.1 channel streaming data is recorded on the disk-type recording medium 91, the signal processing unit 132 detects this and the apparatus control unit 131 outputs an audio output prohibiting instruction to the audio output control unit 133. The audio output control unit 133 generates silent 5.1 channel audio streaming data having the same format as that of the 5.1 channel audio streaming data inputted thereto and supplies the silent 5.1 channel audio streaming data to the HDMI transmitter 79.

Consequently, even when the HDTV receiver 4 connected to the HDMI output connector 62 of the DVD player 122 receives AV streaming data from the DVD player 122 and performs video and audio reproduction based on the received data, the HDTV receiver 4 output no sound; the HDTV receiver 4 outputs no unwanted sound. That is, the HDTV receiver 4 does not interrupt high-quality sound space formed by the 5.1 channel loudspeaker system 5 connected to the DVD player 122; and the viewer of the AV reproduction system 121 can enjoy the high-quality sound space formed by the 5.1 channel loudspeaker system 5.

Alternatively, the HDMI receiver 102 of the HDTV receiver 4 supplies the generated center-channel audio data to the audio codec 106. The audio codec 106 generates the center-channel linear PCM data based on the supplied center-channel audio data. The D/A converter 107 generates a center-channel audio signal based on the center-channel linear PCM data. The audio amplifier 108 amplifies the center-channel audio signal and supplies the audio signal to the 2-channel loudspeaker 109. The 2-channel loudspeaker 109 outputs sounds based on the center-channel audio signal.

As described above, according to the present embodiment 2, in the DVD player 122, when 5.1 channel streaming data is recorded on the disk-type recording medium 91, the signal processing unit 132 detects this and the apparatus control unit 131 outputs a center-channel component output instruction to the audio output control unit 133. The audio output control unit 133 generates audio data having the center-channel component of the 5.1 channel audio streaming data inputted thereto and supplies the audio data to the HDMI transmitter 79.

Consequently, even when the HDTV receiver 4 connected to the HDMI output connector 62 of the DVD player 122 receives AV streaming data from the DVD player 122 and performs video and audio reproduction based on the received data, the HDTV receiver 4 does not output any sound other than the center-channel sound. Since the HDTV receiver 4 is, as described above, arranged at the center (substantially the same position as that of the center loudspeaker) between the left front and right front loudspeakers, when the HDTV receiver 4 outputs the same sound as that of the center loudspeaker, the HDTV receiver 4 outputs no unwanted sound. That is, the HDTV receiver 4 does not interrupt the high-quality sound space formed by the 5.1 channel loudspeaker system 5 connected to the DVD player 122; and the viewer of the AV reproduction system 121 can enjoy the high-quality sound space formed by the 5.1 channel loudspeaker system 5.

Also, whenever enjoying 5.1 channel audio streaming data of the disk-type recording medium 91, the viewer is not required to manipulate the operating unit 112 of the HDTV receiver 4 to set sound mute in the HDTV receiver 4. Also, after enjoying the 5.1 channel audio streaming data of the disk-type recording medium 91, the viewer is not required to manipulate the operating unit 112 of the HDTV receiver 4 to set sound mute cancellation in the HDTV receiver 4. When enjoying 2-channel audio data of the disk-type recording medium 91 or enjoying HDTV broadcast, the viewer is not required to perform a sound mute cancellation operation.

The previous description is of a preferred embodiment for implementing the invention, and the invention is not limited thereto. Many changes or modifications to the embodiments described above are possible without departing from the gist of the invention.

For example, in the above described embodiment 1, the audio streaming detection unit 31 of the AV amplifier 2 determines whether or not audio streaming data has been inputted to the optical input connector 11. In addition, for example, the audio streaming detection unit 31 of the AV amplifier 2 may determine whether or not 5.1 channel audio signals based on audio streaming data has been inputted to a plurality of signal input connectors 12 serving as an audio input terminal. In this variation, the selector 16 may select a plurality of signal input connectors 12.

Figure 10A:
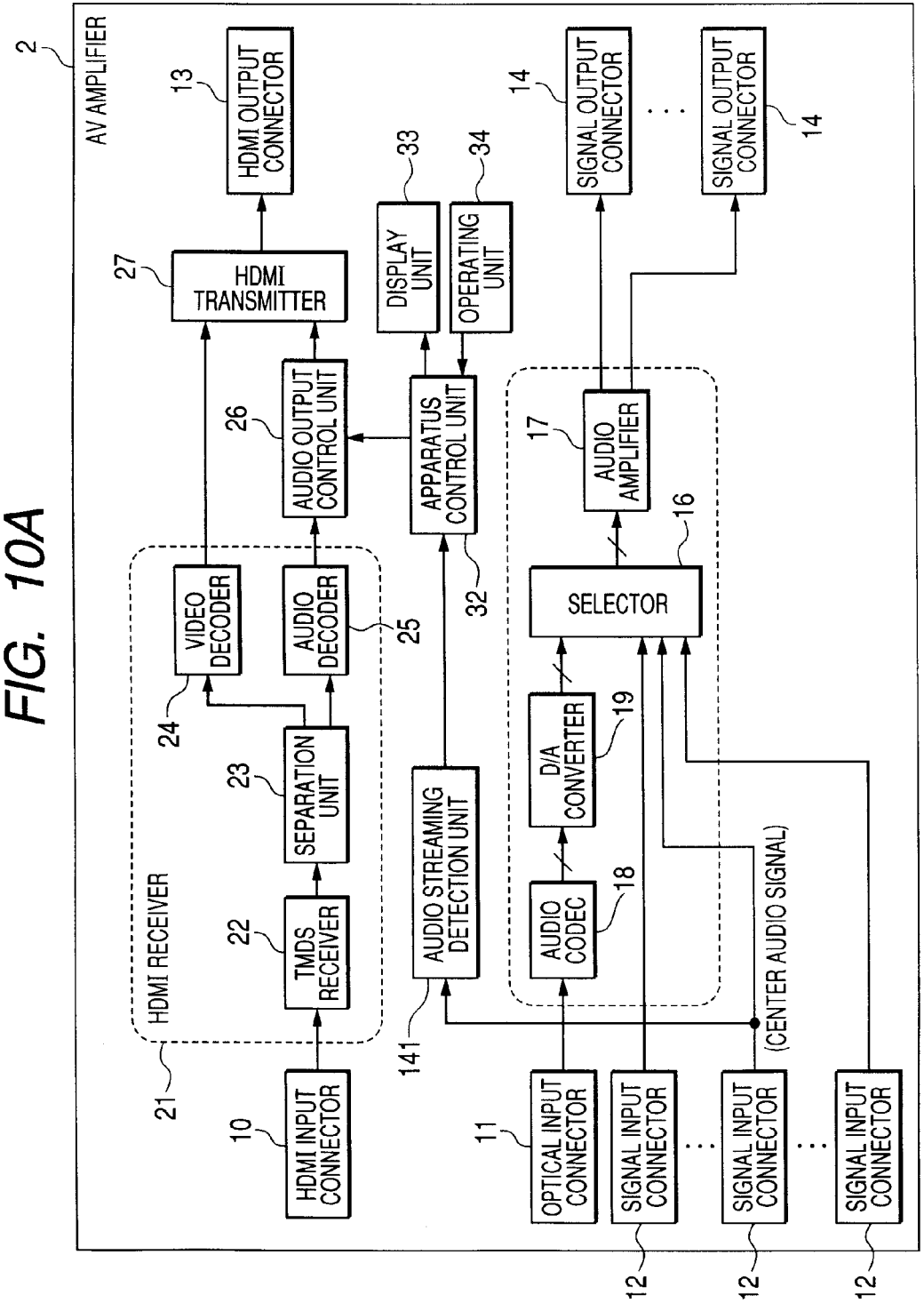
FIG. 10(A) is an apparatus configuration diagram illustrating a variation of the AV amplifier according to Embodiment 1.

FIGS. 10(A) and 10(B) are an apparatus configuration diagram illustrating a variation of the AV amplifier 2 according to Embodiment 1 when the audio streaming detection unit 31 determines whether or not audio streaming data has been inputted to a plurality of signal input connectors 12.

Of a plurality of signal input connectors 12, the signal input connector 12 receiving a center-channel audio signal is connected to the audio streaming detection unit 141. When an audio signal having a predetermined or more level is inputted to the signal input connector 12, the audio streaming detection unit 141 determines that audio streaming data has been inputted to a plurality of the signal input connectors 12. In this case, connected to the audio streaming detection unit 141 may be the signal input connector 12 receiving a left rear audio signal or the signal input connector 12 receiving a right rear audio signal.

In addition, for example, the audio streaming detection unit 31, 141 may determine whether or not audio data generated by the audio decoder 25 of the HDMI receiver 21 is audio streaming data.

According to the above described embodiment 1, as illustrated in FIG. 10(A), when receiving an audio output prohibiting instruction, the audio output control unit 26 of the AV amplifier 2 supplies to the HDMI transmitter 27, silent audio data of the same format as that of audio data inputted thereto. According to the above described embodiment 2, when receiving an audio output prohibiting instruction, the audio output control unit 133 of the DVD player 122 supplies to the HDMI transmitter 79, silent audio data of the same format as that of audio data inputted thereto. In addition, for example, when receiving an audio output prohibiting instruction, the audio output control unit 26, 133 may supply no audio data to the HDMI transmitters 27, 79.

In this variation, only video data is inputted to the HDMI transmitters 27, 79. The HDMI transmitters 27, 79 generates a transmission frame having allotted thereto only video data, i.e., a transmission frame having no audio data and outputs the transmission frame to the HDMI output connectors 13, 62. In the transmission frame having allotted thereto only video data, the data island period 52 for audio data of FIG. 3 is absent, or packet header data or the like other than audio data is stored in the data island period 52 for audio data of FIG. 3.

According to the above described embodiment 1, the AV amplifier 2 converts audio data inputted from the optical input connector 11 into an audio signal and outputs the audio signal to the 5.1 channel loudspeaker system 5. In addition, for example, the AV amplifier 2 may supply audio data inputted from the optical input connector 11 directly to the 5.1 channel loudspeaker system 5. In this variation, the 5.1 channel loudspeaker system 5 decodes the audio data supplied from the AV amplifier 2, performs conversion to an audio signal and outputs the audio signal from the loudspeaker.

According to the above described embodiment 1, the AV amplifier 2 converts audio data inputted from the optical input connector 11 into an audio signal and outputs the audio signal to the 5.1 channel loudspeaker system 5. In addition, for example, the AV amplifier 2 may supply audio data inputted from the optical input connector 11 directly to the 5.1 channel loudspeaker system 5. In this variation, the 5.1 channel loudspeaker system 5 decodes the audio data supplied from the AV amplifier 2, performs conversion to an audio signal and outputs the audio signal from the loudspeaker.

According to the above described embodiment 2, as usual, the 5.1 channel loudspeaker system 5 is connected to a plurality of the signal output connectors 14 of the AV amplifier 2 or to a plurality of the signal output connectors 64 of the DVD player 122. Accordingly, center-channel sound is outputted from both the 5.1 channel loudspeaker system 5 and the HDTV receiver 4. In addition, for example, the 5.1 channel loudspeaker system 5 may be connected only to a plurality of the signal output connectors 14, 64 for the remaining audio components of HDMI AV streaming data, i.e., for components other than the center-channel component. In this variation, even when a center loudspeaker (not illustrated) of the 5.1 channel loudspeaker system 5 is not installed, it is possible to enjoy high-quality sound using 5.1 channels. Since the center loudspeaker is not installed, the installation space of the AV reproduction systems 1, 121 can be reduced.

According to the above described embodiment 2, in the rear stage of the video decoder 73 of the DVD player 3, there is arranged the IP converter 74; and the video encoder 75 and the scaler 77 process video data converted into progressive video data by the IP converter 74. In addition, for example, the video encoder 75 and the scaler 77 may process interlaced video data generated by the video decoder 73 of the DVD player 3. In this variation, the HDMI transmitter 79 generates AV streaming data having interlaced video data and outputs the AV streaming data to the HDMI output connector 62.

The present invention can be applied to an AV reproduction system or the like which connects a HDTV receiver by use of HDMI.

What is claimed is:

1. A relay apparatus comprising:
    an input terminal configured to be inputted with first data including first audio data being audio data of one content and video data;
    a separation unit configured to separate the video data and the first audio data from the first data inputted to the input terminal;
    a control unit configured to control output of the first audio data separated by the separation unit;
    a first output unit configured to output second data including the video data separated by the separation unit and the first audio data controlled by the control unit;
    an audio input terminal configured to be input with second audio data being audio data of the one content; and
    a detection unit configured to detect whether or not the second audio data inputted to the audio input terminal has a predetermined format,
    wherein, in a case where it is detected by the detection unit that the second audio data has the predetermined format, the control unit controls the output of the first audio data.

2. The relay apparatus according to claim 1, further comprising a second output unit configured to output the second audio data inputted to the audio input terminal.

3. The relay apparatus according to claim 1, wherein the first audio data separated by the separation unit is controlled and outputted as silent audio data by the control unit.

4. The relay apparatus according to claim 1, wherein only a predetermined audio channel is selected and outputted from the first audio data separated by the separation unit, by the control unit.

5. The relay apparatus according to claim 1, wherein it is controlled by the control unit not to output the first audio data separated by the separation unit.

6. A reproduction system which includes a relay apparatus and a record and reproduction apparatus, wherein:

the relay apparatus comprises
- an input terminal configured to be inputted with first data including first audio data being audio data of one content and video data,
- a separation unit configured to separate the video data and the first audio data from the first data inputted to the input terminal,
- a control unit configured to control output of the first audio data separated by the separation unit,
- an output unit configured to output second data including the video data separated by the separation unit and the first audio data controlled by the control unit,
- an audio input terminal configured to be input with second audio data being audio data of the one content, and
- a detection unit configured to detect whether or not the second audio data inputted to the audio input terminal has a predetermined format, wherein, in a case where it is detected by the detection unit that the second audio data has the predetermined format, the control unit controls the output of the first audio data; and the record and reproduction apparatus is connected to the input terminal and the audio input terminal of the relay apparatus, outputs the first data including the first audio data being the audio data of the one content and the video data to the input terminal, and outputs the second audio data being the audio data of the one content to the audio input terminal.

* * * * *